US012304579B2

(12) United States Patent
Roger et al.

(10) Patent No.: US 12,304,579 B2
(45) Date of Patent: May 20, 2025

(54) SUPPORT STRUCTURE FOR CONNECTING A PLURALITY OF SUPPORT WHEEL ASSEMBLIES TO A FRAME MEMBER OF A TRACK SYSTEM AND TRACK SYSTEM HAVING THE SAME

(71) Applicant: SOUCY INTERNATIONAL INC., Drummondville (CA)

(72) Inventors: Yan Roger, Drummondville (CA); Stephane Genois Pelletier, Drummondville (CA); Jeremie Aubin-Marchand, St-Hugues (CA); Benoit Savage, St-Bonaventure (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 501 days.

(21) Appl. No.: 17/828,614

(22) Filed: May 31, 2022

(65) Prior Publication Data

US 2022/0388584 A1     Dec. 8, 2022

Related U.S. Application Data

(60) Provisional application No. 63/195,856, filed on Jun. 2, 2021.

(51) Int. Cl.
*B62D 55/104*     (2006.01)
*B62D 55/084*     (2006.01)
*B62D 55/12*      (2006.01)
*B62D 55/18*      (2006.01)

(52) U.S. Cl.
CPC ......... *B62D 55/104* (2013.01); *B62D 55/084* (2013.01); *B62D 55/18* (2013.01); *B62D 55/12* (2013.01)

(58) Field of Classification Search
CPC .. B62D 55/104; B62D 55/1086; B62D 55/12; B62D 55/14; B62D 55/116; B62D 55/084
See application file for complete search history.

(56) References Cited

U.S. PATENT DOCUMENTS

| 1,329,769 | A | 2/1920 | Henry |
|---|---|---|---|
| 1,463,366 | A | 7/1923 | Leake |
| 2,057,211 | A | 10/1936 | Shere |
| 2,728,611 | A | 12/1955 | Brauss |
| 2,779,636 | A | 1/1957 | Allen |
| 3,343,889 | A | 9/1967 | Eugen |

(Continued)

FOREIGN PATENT DOCUMENTS

WO        2019043361 A1     8/2018

*Primary Examiner* — Jason R Bellinger
(74) *Attorney, Agent, or Firm* — BCF LLP

(57) ABSTRACT

A support structure for a track system is disclosed. The support structure has leading and trailing linkages which are pivotally connectable to a frame member of the track system through, respectively, leading and trailing pivots. The leading linkage is pivotally connected to the trailing linkage through an intermediate pivot. The support structure has at least one biasing assembly. Leading, intermediate and trailing support wheel assemblies are connected to the support structure, which is adapted to move such that when the leading support wheel assembly moves in a first direction, the intermediate support wheel assembly moves in a second direction, and the trailing support wheel assembly moves in the first direction. A track system having the support structure and a vehicle having the track system is also disclosed.

20 Claims, 14 Drawing Sheets

(56) References Cited

U.S. PATENT DOCUMENTS

| | | | |
|---|---|---|---|
| 3,447,620 | A | 6/1969 | Schoonover |
| 3,664,449 | A | 5/1972 | Vardell |
| 3,841,424 | A | 10/1974 | Purcell et al. |
| 3,938,605 | A | 2/1976 | Koch |
| 3,948,331 | A | 4/1976 | Esch |
| 4,262,764 | A | 4/1981 | Kraus |
| 4,339,156 | A | 7/1982 | Livesay |
| 4,953,919 | A | 9/1990 | Langford |
| 5,113,958 | A | 5/1992 | Holden |
| 5,340,205 | A | 8/1994 | Nagorcka |
| 5,997,109 | A | 12/1999 | Kautsch |
| 6,007,166 | A | 12/1999 | Tucker et al. |
| 6,203,124 | B1 | 3/2001 | Meyer et al. |
| 6,904,986 | B2 | 6/2005 | Brazier |
| 8,607,903 | B2 | 12/2013 | Godin et al. |
| 8,636,326 | B2 | 1/2014 | Inaoka |
| 8,955,925 | B2 | 2/2015 | Bessette et al. |
| 9,415,818 | B1 | 8/2016 | Tiede et al. |
| 9,434,427 | B1 | 9/2016 | Tiede et al. |
| 9,802,660 | B2 | 10/2017 | Johnson |
| 10,399,619 | B1 | 9/2019 | Kautsch |
| 10,569,816 | B2 | 2/2020 | Casters |
| 2012/0242141 | A1 | 9/2012 | Bessette et al. |
| 2015/0114730 | A1 | 4/2015 | Gulliksson |
| 2016/0236733 | A1 | 8/2016 | Tiede et al. |
| 2017/0043819 | A1 | 2/2017 | Wu et al. |
| 2019/0009846 | A1 | 1/2019 | Caster |
| 2019/0202508 | A1 | 7/2019 | Sauvageau et al. |

SUPPORT STRUCTURE FOR CONNECTING A PLURALITY OF SUPPORT WHEEL ASSEMBLIES TO A FRAME MEMBER OF A TRACK SYSTEM AND TRACK SYSTEM HAVING THE SAME

CROSS-REFERENCE TO RELATED APPLICATION

This application claims the benefit of and priority to U.S. provisional patent application No. 63/195,856, filed on Jun. 2, 2021; the content of both of which is herein incorporated in entirety by reference.

TECHNICAL FIELD

The present technology relates to support structures for track systems and track systems for vehicles.

BACKGROUND

Certain vehicles, such as, for example, agricultural vehicles (e.g., harvesters, combines, tractors, etc.), construction vehicles (e.g., bulldozers, front-end loaders, etc.) and recreational vehicles (e.g., all-terrain vehicles, utility-terrain vehicles, side-by-side vehicles, etc.) are used on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kinds of ground surfaces and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. When the vehicle is a recreational vehicle, the tires may lack traction on certain terrain and in certain conditions.

In order to reduce the aforementioned drawbacks, to increase traction and to distribute the weight of the vehicle over a larger area on the ground surface, track systems were developed to be used in place of at least some of the wheels and tires on the vehicles. For example, under certain conditions, track systems enable agricultural vehicles to be used in wet field conditions as opposed to its wheeled counterpart. In other conditions, track systems enable recreational vehicles to be used in low traction terrains such as snowy roads.

Conventional track systems do, however, present some inconveniences. Conventional track systems usually have numerous components, such as support wheel assemblies. Each support wheel assembly typically includes a pair of support wheels that are laterally spaced apart, and disposed for engaging the inner surface of the endless track. Such track systems can be expensive to manufacture due to the number of components required, and can also be difficult to assemble. In addition, track systems having such support wheel assemblies may be subjected to undesirable accumulation of matter, such as mud, between the components of the track system.

Therefore, there is a desire for a track system that could mitigate the above-mentioned issues.

SUMMARY

It is therefore an object of the present technology to ameliorate the situation with respect to at least one of the inconveniences present in the prior art.

It is also an object of the present technology to provide an improved track system and support wheel assemblies at least in some instances as compared with some of the prior art.

The present technology relates to a support structure for a track system. The support structure has linkages which are pivotally connectable to a frame member of the track system. The linkages, to which wheels are rotatably connected, move in such a way that the support structure aids the track system in overcoming encountered obstacles. The linkages are biased to return toward an initial position, which also aids the track system to overcome encountered obstacles.

In the context of the following description, "outwardly" or "outward" means away from a longitudinal center plane of the track system, and "inwardly" or "inward" means toward the longitudinal center plane. In addition, in the context of the following description, "longitudinally" means in a direction parallel to the longitudinal center plane of the track system in a plane parallel to flat level ground, "laterally" means in a direction perpendicular to the longitudinal center plane in a plane parallel to flat level ground, and "generally vertically" means in a direction contained in the longitudinal center plane along a height direction of the track system generally perpendicular to flat level ground. Note that in the Figures, a "+" symbol is used to indicate an axis of rotation. In the context of the present technology, the term "axis" may be used to indicate an axis of rotation. Also, the terms "pivot assembly" and "wheel assemblies" include all the necessary structure (bearing structures, pins, axles and other components) to permit a structure/wheel to pivot/rotate about an axis, as the case may be. Moreover, the direction of forward travel of the track system is indicated by an arrow in FIG. 1. In the present description, the "leading" components are components located towards the front of the vehicle defined consistently with the vehicle's forward direction of travel, and the "trailing" components are components located towards the rear of the vehicle defined consistently with the vehicle's forward direction of travel. In the following description and accompanying Figures, the track system is configured to be attached to a right side of the chassis of the vehicle. In the context of the present technology, the qualification of a wheel assembly as "at least indirectly connected" includes a wheel assembly that is directly connected to the at least one wheel-bearing frame member as well as a wheel assembly that is connected to the wheel-bearing frame member through an intermediate structure or structures, be they intermediate frame members or otherwise.

According to an aspect of the present technology, there is a support structure for connecting a plurality of support wheel assemblies to a frame member of a track system. The track system defines a longitudinal direction, and the support structure includes a leading linkage, a trailing linkage and at least one biasing assembly. The leading linkage is pivotally connectable to the frame member by a leading pivot which defines a leading pivot axis transverse to the longitudinal direction. The trailing linkage is pivotally connectable to the frame member by a trailing pivot which defines a trailing pivot axis transverse to the longitudinal direction. The trailing linkage is also pivotally connected to the leading linkage by an intermediate pivot which defines an intermediate pivot axis transverse to the longitudinal direction. The at least one biasing assembly is connected to at least one of the leading linkage and the trailing linkage. The plurality of support wheel assemblies includes a leading support wheel assembly connected to the leading linkage, a trailing support wheel assembly connected to the trailing linkage, and an intermediate support wheel assembly connected to at least one of the leading and trailing linkages. The support structure is adapted to move such that when the leading support wheel assembly moves in a first direction, the intermediate support wheel assembly moves in a second direction, and the trailing support wheel assembly moves in the first direction. The support structure, the leading, intermediate and trailing support wheel assemblies having an initial position, and the at least one biasing assembly biasing the support structure to return toward the initial position upon movement of any one of the leading, intermediate and trailing support wheel assemblies.

In some embodiments, upon movement of any one of the leading, intermediate and trailing support wheel assemblies, the leading linkage pivots about the leading pivot, and the trailing linkage pivots about the trailing pivot.

In some embodiments, the leading linkage and the trailing linkage pivot about the intermediate pivot in a scissor-like fashion.

In some embodiments, the at least one biasing assembly includes a leading biasing assembly, an intermediate biasing assembly and a trailing biasing assembly.

In some embodiments, the leading biasing assembly is connected to the leading pivot, the intermediate biasing assembly is connected the intermediate pivot, and the trailing biasing assembly is connected to the trailing pivot.

In some embodiments, the leading, intermediate and trailing biasing assemblies have different biasing forces.

In some embodiments, at least two of the leading, intermediate and the trailing biasing assemblies have equal biasing forces.

In some embodiments, at least one of: the leading pivot has a square cross-section, the leading biasing assembly includes a leading housing connected to the leading linkage, and four resilient elements seated in the corners of the leading housing and being pressed against the leading housing by the leading pivot; the trailing pivot has a square cross-section, the trailing biasing assembly includes a trailing housing connected to the trailing linkage, and four resilient elements seated in the corners of the trailing housing and being pressed against the trailing housing by the trailing pivot; and the intermediate pivot has a square cross-section, the intermediate biasing assembly includes an intermediate housing connected to one of the leading and trailing linkages, and four resilient elements seated in the corners of the intermediate housing and being pressed against the intermediate housing by the intermediate pivot.

In some embodiments, the leading, intermediate and trailing support wheel assemblies are longitudinally in-line.

In some embodiments, the leading, intermediate and trailing support wheel assemblies are laterally centered relative to an endless track of the track system.

In some embodiments, the intermediate support wheel assembly is connected to the leading linkage and to the trailing linkage by the intermediate pivot.

In some embodiments, at least one of the leading pivot is positioned at a midway point of the leading linkage, and the trailing pivot is positioned at a midway point of the trailing linkage.

In some embodiments, at least one of the leading pivot is offset from the midway point of the leading linkage, and the trailing pivot is offset from the midway point of the trailing linkage.

According to another aspect of the present technology, there is provided a track system including a frame having a frame member, idler wheel assemblies connected to the frame, and a support structure according to the above aspect or according to the above aspect and one or more of the above embodiments connecting the leading, intermediate and trailing support wheel assemblies to the frame member, and an endless track wrapped around the idler wheel assemblies, and the leading, intermediate and trailing support wheel assemblies.

According to another aspect of the present technology, there is provided a track system for a vehicle. The track system defines a longitudinal direction, and includes a frame member, idler wheel assemblies, a support structure a plurality of support wheel assemblies and an endless track. The frame has a frame member. The idler wheel assemblies are connected to the frame. The support structure includes a leading linkage, a trailing linkage and at least one biasing assembly. The leading linkage is pivotally connected to the frame member by a leading pivot which defines a leading pivot axis transverse to the longitudinal direction. The trailing linkage is pivotally connected to the frame member by a trailing pivot which defines a trailing pivot axis transverse to the longitudinal direction. The trailing linkage is also pivotally connected to the leading linkage by an intermediate pivot which defines an intermediate pivot axis transverse to the longitudinal direction. The at least one biasing assembly is connected to at least one of the leading linkage and the trailing linkage. The plurality of support wheel assemblies includes a leading support wheel assembly connected to the leading linkage, a trailing support wheel assembly connected to the trailing linkage, and an intermediate support wheel assembly connected to at least one of the leading and trailing linkages. The endless track is wrapped around the idler wheel assemblies, and the leading, intermediate and trailing support wheel assemblies. The support structure is adapted to move such that when the leading support wheel assembly moves in a first direction, the intermediate support wheel assembly moves in a second direction, and the trailing support wheel assembly moves in the first direction. The support structure, the leading, intermediate and trailing support wheel assemblies have an initial position, and the at least one biasing assembly biases the support structure to return toward the initial position upon movement of any one of the leading, intermediate and trailing support wheel assemblies.

In some embodiments, the endless track includes a plurality of reinforcing members that extend laterally across the endless track, and are distributed longitudinally along the endless track.

In some embodiments, the track system is steerable.

In some embodiments, the track system is connected to a driving axle of a vehicle, the driving axle defining a driving axle axis, and the leading, intermediate and trailing pivot axes are longitudinally offset from the driving axle axis.

According to another aspect of the present technology there is provided a vehicle having a chassis, an engine supported by the chassis and at least two track systems according to the above aspect or according to the above aspect and one or more of the above embodiments. The two tracks are connected to the chassis.

In some embodiments, the vehicle is an all-terrain vehicle.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

With reference to FIGS. 1 to 13, a track system 50, which has a support structure 100, is illustrated. It is to be expressly understood that the track system 50 and the support structure 100 are merely embodiments of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to the track system 50 and the support structure 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the track system 50 and the support structure 100 may provide in certain aspects simple embodiments of the present technology, and that where such is the case it has been presented in this manner as an aid to understanding. As persons skilled in the art would understand, various embodiments of the present technology may be of a greater complexity than what is described herein.

Figure 1:
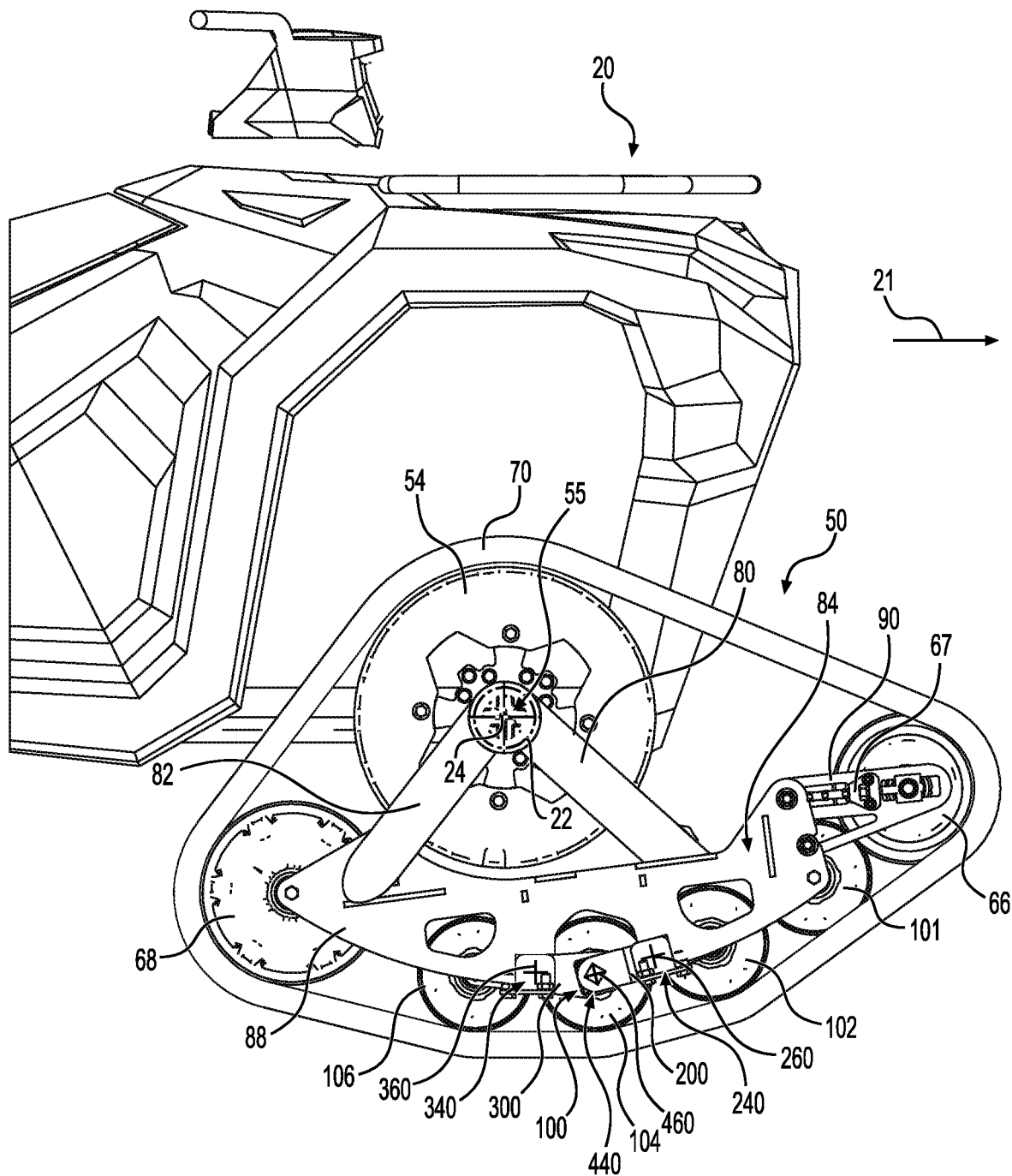
FIG. 1 is a close-up, right side elevation view of an all-terrain-vehicle equipped with a front, right track system having a support structure in accordance with an embodiment of the present technology, and an endless track.

The present technology is presented herein with reference to an all-terrain vehicle 20 shown partially in FIG. 1. The direction of forward travel of the vehicle 20 is indicated by arrow 21 in FIG. 1. Referring to FIG. 1, the track system 50 is operatively connected to the vehicle 20 in the front, right corner. The support structure 100 is part of the track system 50.

Figure 5:
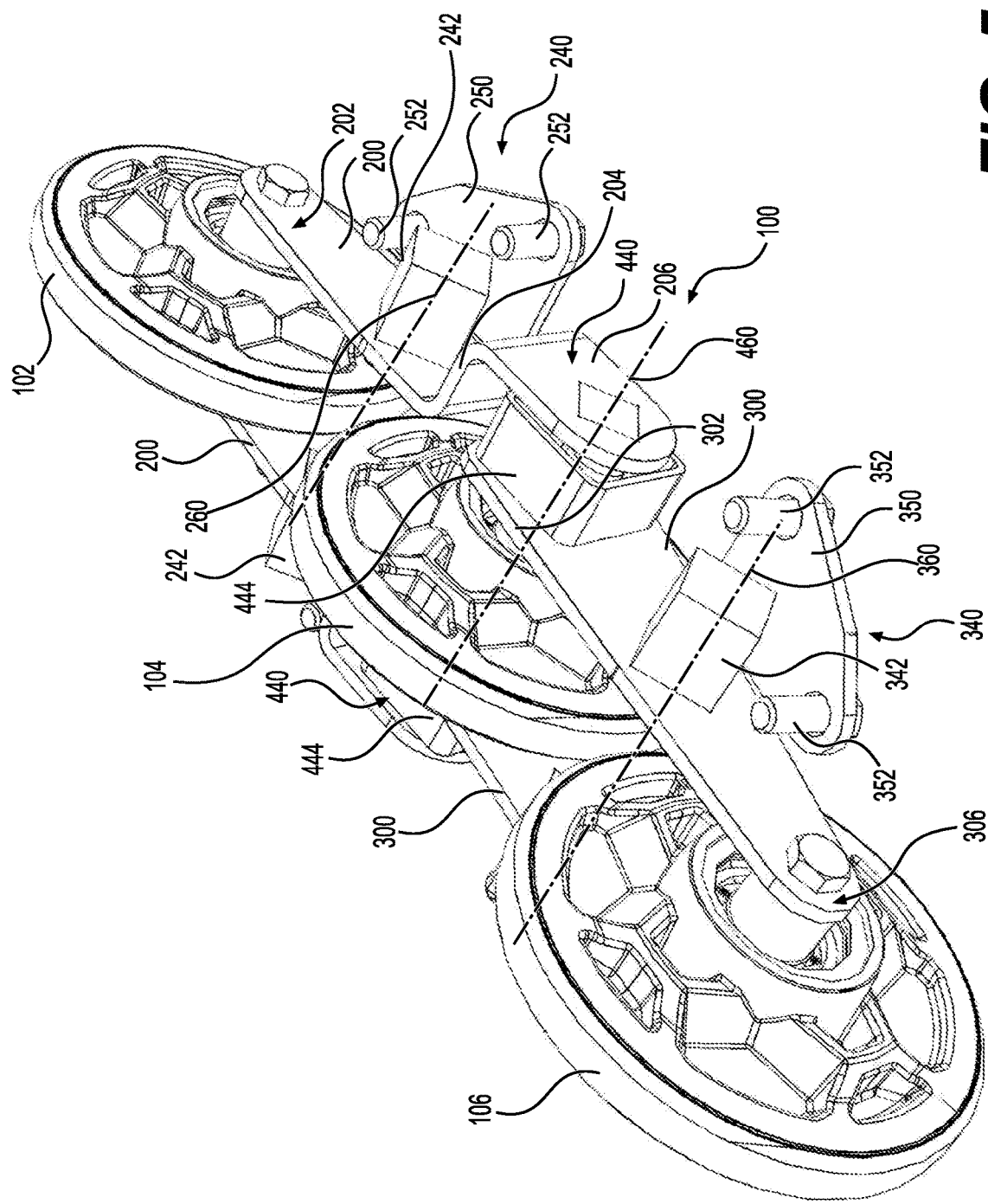
FIG. 5 is a perspective view taken from a top, rear, right side of the support structure of FIG. 1.
Figure 10:
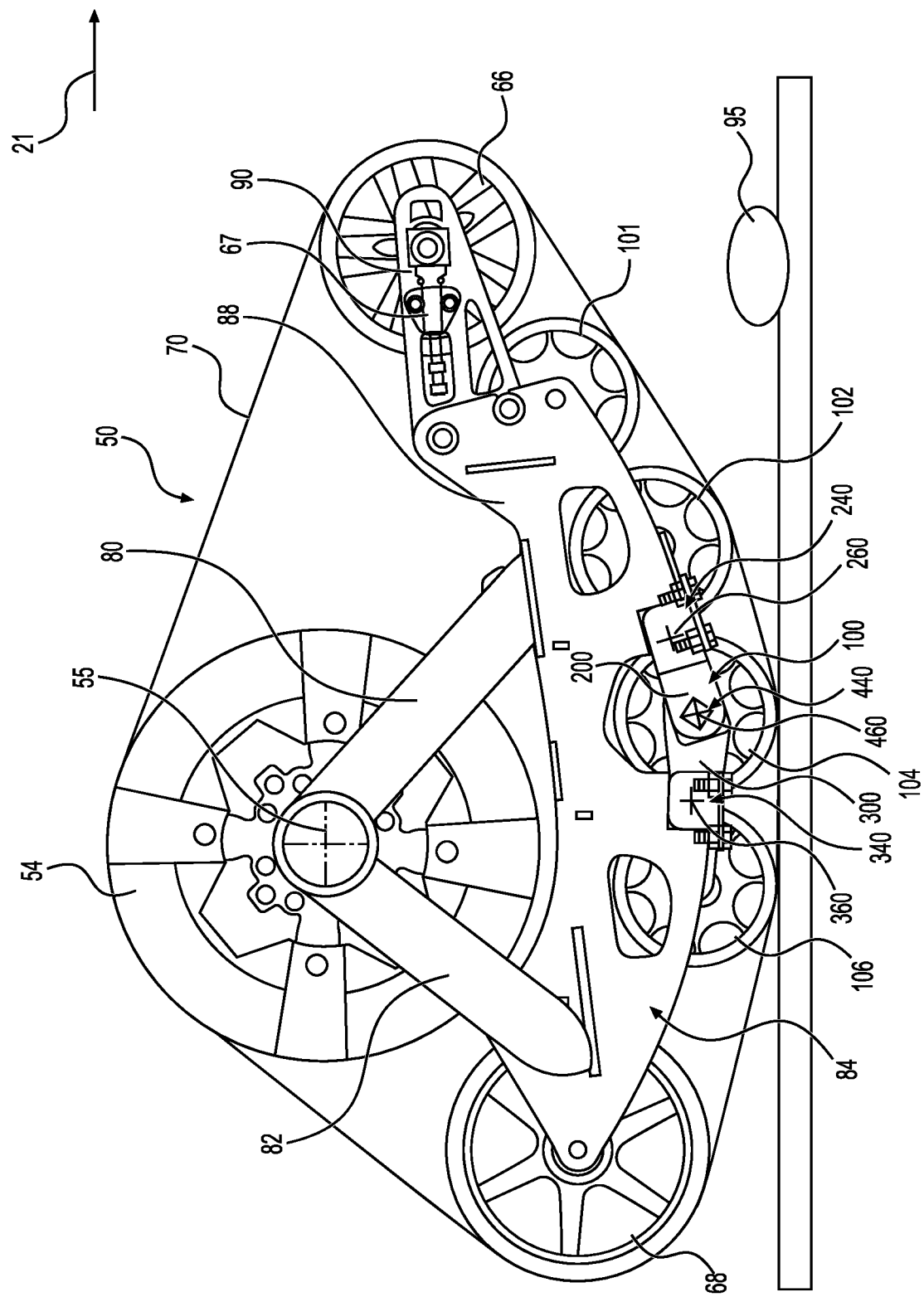
FIG. 10 is a right side elevation view of the track system of FIG. 1 disposed on a ground surface in an initial position.

Generally described and referring to FIG. 5, the support structure 100 includes left and right leading linkages 200, and left and right trailing linkages 300. A leading support wheel assembly 102, an intermediate support wheel assembly 104 and a trailing support wheel assembly 106 are connected to the leading and trailing linkages 200, 300. The track system 50 and the support structure 100 have an initial position shown in FIG. 10. The initial position corresponds to the position the track system 50 and the support structure 100 when we the track system 50 supports a nominal load, is not steered, and travels on flat, level ground. Upon movement of any one of the leading and trailing linkages 200, 300 and/or the leading, intermediate and trailing support wheel assemblies 102, 104, 106, biasing forces, which in the present embodiment are caused by leading, intermediate and trailing biasing assemblies 246, 446, 346 (FIG. 7), bias the support structure 100 to return toward its initial position (FIG. 10). The movement of the leading and trailing linkages 200, 300 generally resembles the movement made by scissors. As will become apparent from the description below, the support structure 100 may assist the track system 50 to overcome encountered obstacles, at least in some conditions.

All-Terrain-Vehicle

Referring to FIG. 1, the track system 50 is operatively connected to the vehicle 20. The vehicle 20 is an all-terrain-vehicle (ATV). It is contemplated that in alternate embodiments, the vehicle 20 could be a snowmobile, a side-by-side vehicle, a utility-terrain vehicle or another recreational vehicle. It is also contemplated that the vehicle 20 could be a harvester, a tractor, or another agricultural vehicle. Other vehicles are contemplated, and the track system 50 including the present technology is structured and configured to be used on such vehicles. Though only the front right track system 50 is shown and described herein, the vehicle 20 includes front left, rear left and rear right track systems configured to be operatively connected to their respective corners of the vehicle 20. It is contemplated that in some embodiments, the vehicle 20 could be adapted to receive less than four track systems 50. In other embodiments, the vehicle 20 could be adapted to receive more than four track systems 50.

Track System

Referring to FIGS. 1 to 4, the track system 50 defines a longitudinal center plane 52 (FIGS. 2 and 4) that passes through the track system 50, and splits the track system 50 into a left longitudinal side and a right longitudinal side. For the purpose of the following description, components that are qualified as "left" or "right" are positioned on the corresponding left longitudinal side and right longitudinal side of the track system 50, unless mentioned otherwise.

The track system 50 has a sprocket wheel assembly 54 which is connected to a driving axle 22 (schematically shown in FIG. 1) of the vehicle 20. The driving axle 22 defines a driving axle axis 24 (FIG. 1). The driving axle 22 drives the sprocket wheel assembly 54 such that the sprocket wheel assembly 54 can rotate about a sprocket axis 55 being coaxial with the driving axle axis 24. The sprocket axis 55 is perpendicular to the longitudinal center plane 52. The sprocket wheel assembly 54 defines two sets of laterally spaced recesses 56 that are longitudinally spaced on the circumference of the sprocket wheel assembly 54. The two sets of laterally spaced recesses 56 are adapted, as will be described in greater detail below, to receive left and right sets of laterally spaced lugs 76 provided on the endless track 70.

The track system 50 also has a leading frame arm 80 and a trailing frame arm 82. The leading and trailing frame arms 80, 82 are jointly connected around the driving axle 22 of the vehicle 20, the joint connection being positioned laterally outwardly from the sprocket wheel assembly 54, such that that driving axle 22 is free to rotate with reference to the leading and trailing arms 80, 82. The leading frame arm 80 extends from the driving axle 22, in the forward direction, and connects to a forward portion of a frame assembly 84. The trailing frame arm 82 extends from the driving axle 22, in the rearward direction, and connects to a rear portion of the frame assembly 84. It is contemplated that in other embodiments, the track system 50 could be configured differently. For instance, the track system 50 could have only one frame arm, or more than two frame arms.

Figure 2:
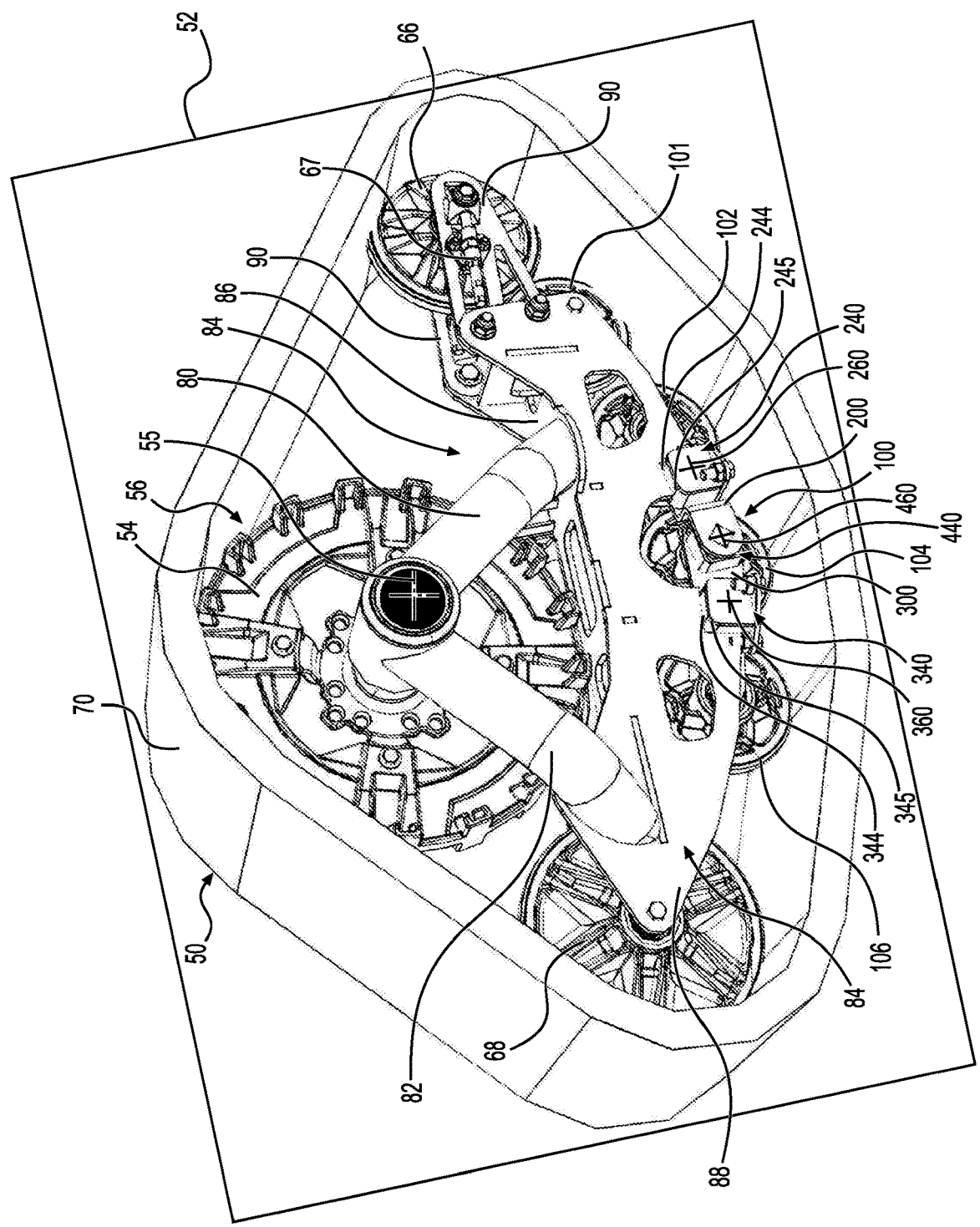
FIG. 2 is a perspective view taken from a top, rear, right side of the track system of FIG. 1.

Referring to FIG. 2, the frame assembly 84 has a top frame member 86 as well as left and right frame members 88. In the present embodiment, the top frame member 86 is fastened to the left and right frame members 88. It is contemplated that in some embodiments, the top frame member 86 and the left and right frame members 88 could be connected to one another differently, for instance, by rivets or by welding. In other embodiments, the frame assembly 84 could be one integral member. In yet other embodiments, the frame assembly 84 could be made of more than three members. As mentioned above, the leading and trailing frame arms 80, 82 are connected to the frame assembly 84. More precisely, the leading frame arm 80 is connected to the top frame member 86, and the trailing frame arm 82 is connected to the exterior of the right frame member 88.

The track system 50 also has left and right idler linkages 90. The left and right idler linkages 90 are respectively fastened to the front portions of left and right frame members 88. It is contemplated that the left and right idler linkages 90 could be connected to the left and right frame members 88 differently, such as with rivets or by welding. It is also contemplated that in some embodiments, the left and right idler linkages 90 could respectively be integrated to the left and right frame members 88. In yet other embodiments, the left and right idler linkages 90 could be omitted. The left and right idler linkages 90 can facilitate the installation and/or the removal of the endless track 70 by largely adjusting the tension within the endless track 70. This is useful, for instance, when the endless track 70 has been "de-tracked" (i.e. the left and right sets of lugs 76 no longer engage one or some of the wheel assemblies 66, 68, 101, 102, 104, 106).

The track system 50 further has a leading idler wheel assembly 66. The leading idler wheel assembly 66 is rotatably connected between the left and right idler linkages 90. In the present embodiment, the leading idler wheel assembly 66 is also connected to a tensioner 67 that is operable to fine-tune the tension in the endless track 70 by selectively moving the idler wheel assembly 66 forward or backward. It is contemplated that in some embodiments, the tensioner 67 could be operable to approximately adjust the tension in the endless track 70.

The track system 50 also has a trailing idler wheel assembly 68. The trailing idler wheel assembly 68 is rotatably connected between the rear portions of the left and right frame members 88. It is contemplated that in some embodiments, the leading and/or the trailing idler wheel assemblies 66, 68 could be configured otherwise.

Figure 3:
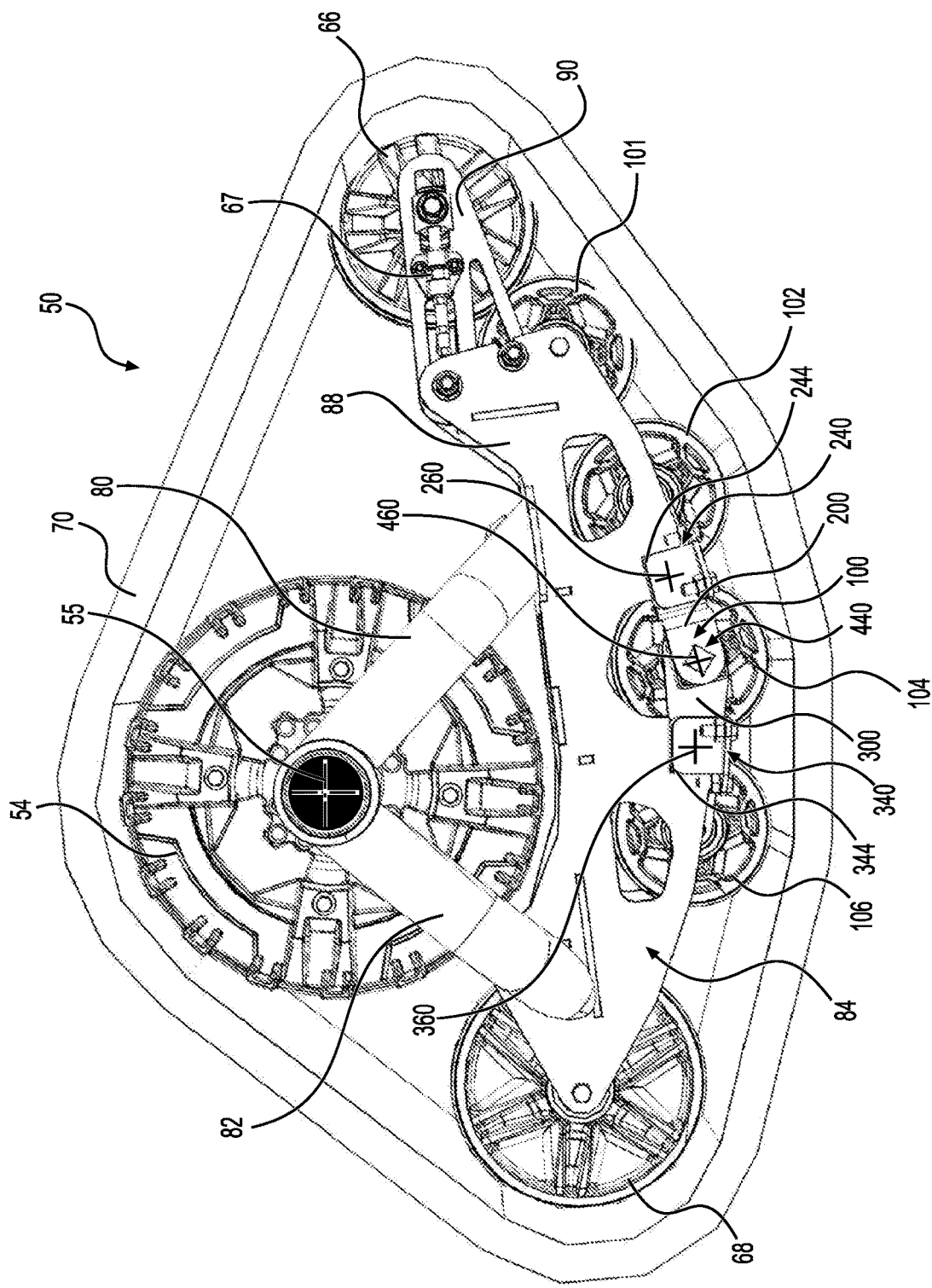
FIG. 3 is a right side elevation view of the track system of FIG. 1.

Referring to FIGS. 1 to 3, the track system 50 has four support wheel assemblies. There is a frame support wheel assembly 101, the leading support wheel assembly 102, the intermediate support wheel assembly 104 and the trailing support wheel assembly 106.

The frame support wheel assembly 101 is rotatably connected to the forward portion of the frame assembly 84, longitudinally forward to the leading, intermediate and trailing support wheel assemblies 102, 104, 106. It is contemplated that in some embodiments, the frame support wheel assembly 101 could be connected to the frame assembly 84, longitudinally rearwardly to the leading, intermediate and trailing support wheel assemblies 102, 104, 106. It is also contemplated that the frame support wheel assembly 101 could be omitted. In yet other embodiments, there could be two or more support wheel assemblies 101.

The leading, intermediate and trailing, support wheel assemblies 102, 104, 106 are rotatably connected to the frame assembly 84 through the support structure 100. More precisely, the leading support wheel assembly 102 is rotatably connected to the left and right leading linkages 200, the intermediate support wheel assembly 104 is rotatably connected to left and right leading linkages 200 and to the left and right trailing linkages 300, and the trailing support wheel assembly 106 is rotatably connected to the left and right trailing linkages 300. The support structure 100 will be described in greater detail below.

Figure 4:
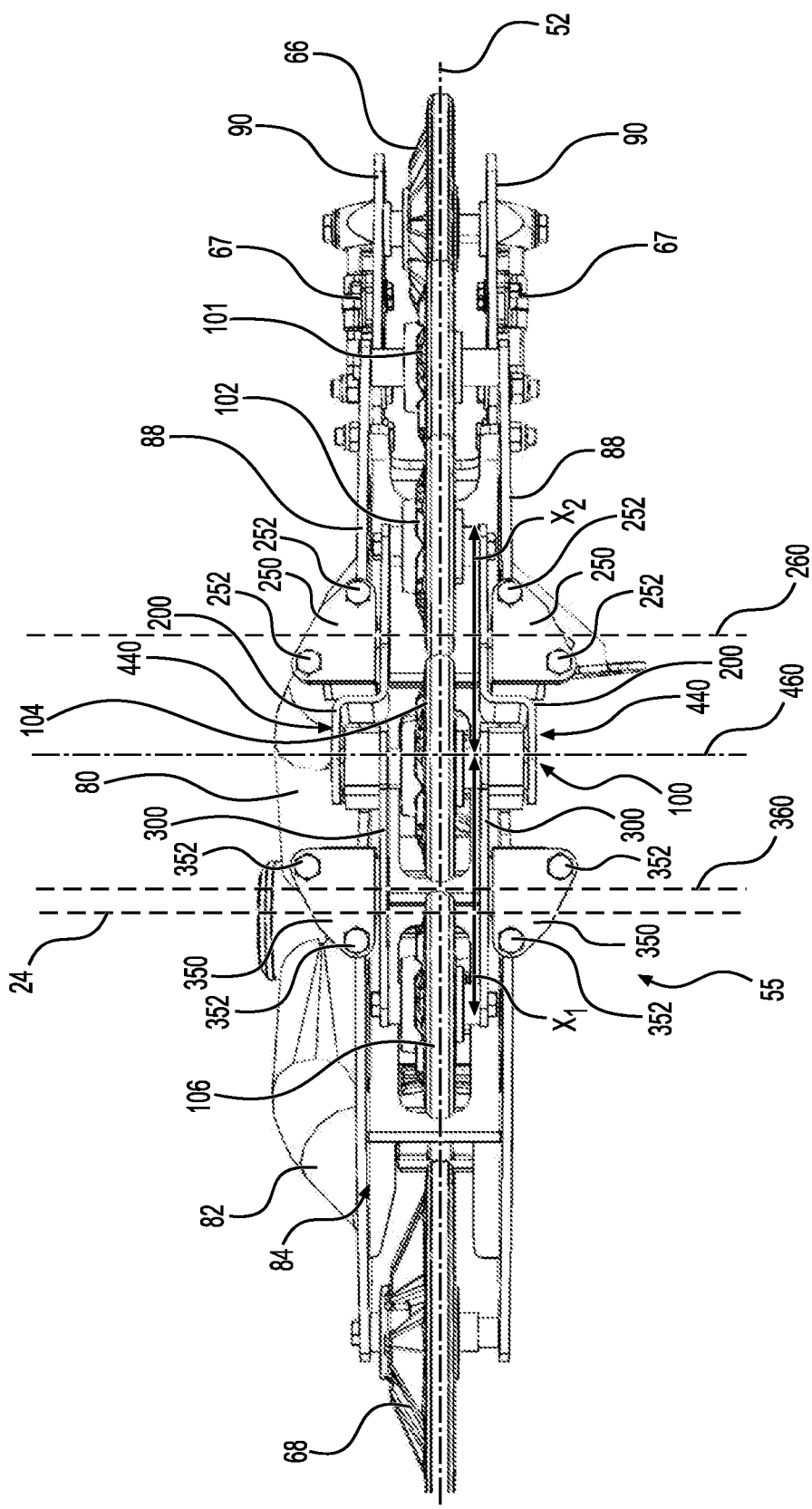
FIG. 4 is a bottom plan view of the track system of FIG. 1, with the endless track omitted.

Referring now to FIG. 4, the leading idler wheel assembly 66, the frame support wheel assembly 101, the leading, intermediate and trailing support wheel assemblies 102, 104, 106 and the trailing idler wheel assembly 68, which will henceforth be communally referred to as wheel assemblies 66, 68, 101, 102, 104, 106 are longitudinally aligned (i.e. in an in-line arrangement). In the present embodiment, the wheel assemblies 66, 68, 101, 102, 104, 106 are aligned along the longitudinal center plane 52.

The track system 50 further includes the endless track 70 that extends around the sprocket wheel assembly 54, leading and trailing frame arms 80, 82, the frame assembly 84, the idler linkages 90, and the wheels 66, 68, 101, 102, 104, 106. The endless track 70 will be described in greater detail below.

Support Structure

Referring now to FIGS. 4 to 8, the support structure 100 will be described in more detail. The support structure 100 has the left and right leading linkages 200 and the left and right trailing linkages 300. It is contemplated that in some embodiments, the left and right leading linkages 200 could be one leading linkage, and that the left and right trailing linkages 300 could be one trailing linkage. The left and right leading linkages 200 are pivotally connected to the frame assembly 84 through left and right leading pivot assemblies 240. The left and right trailing linkages 300 are pivotally connected to the frame assembly 84 through left and right trailing pivot assemblies 340. Also, the left and right leading linkages 200 are respectively pivotally connected to the left and right trailing linkages 300 through left and right intermediate pivot assemblies 440.

Figure 6A:
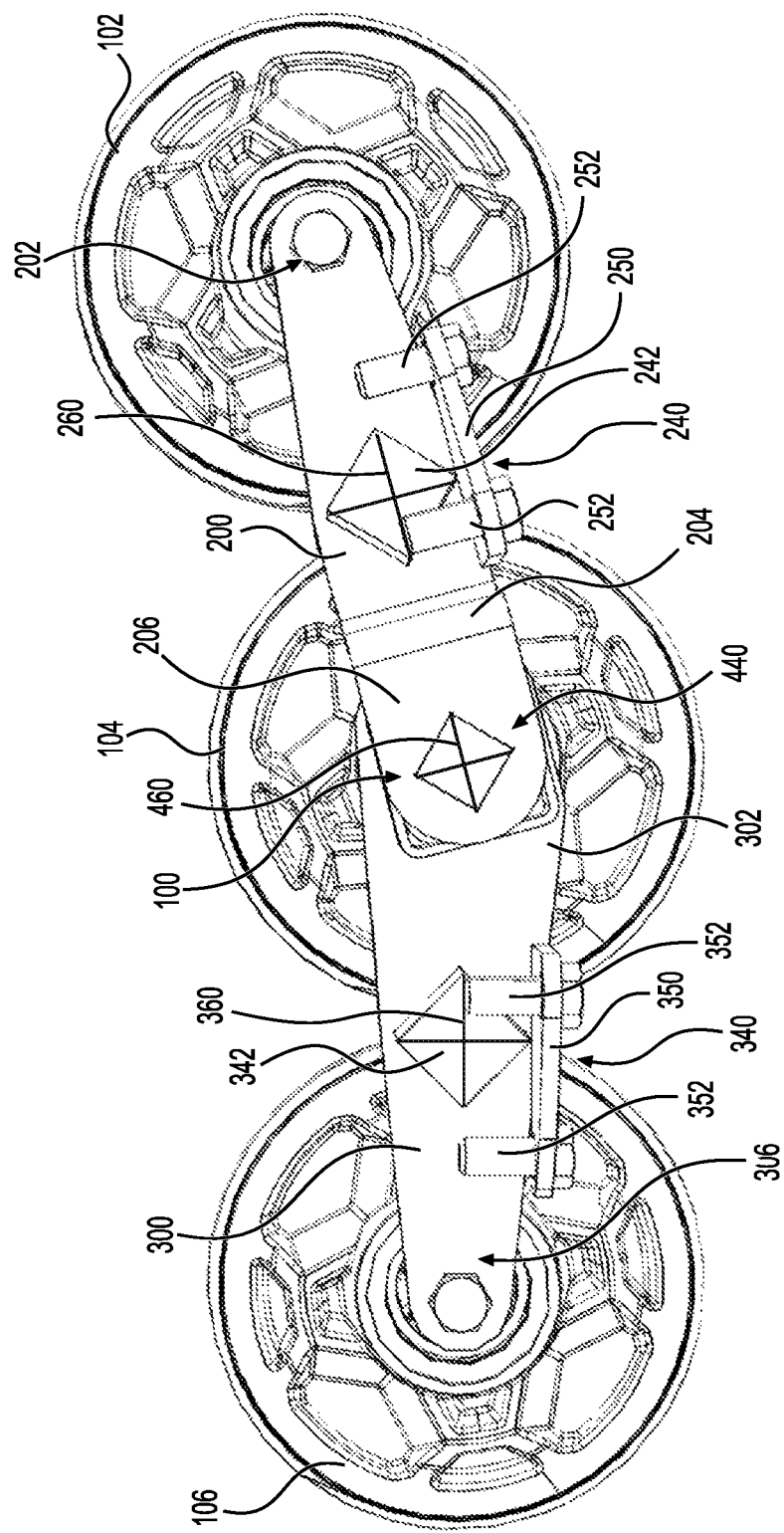
FIG. 6A is a right side elevation view of the support structure of FIG. 5.
Figure 6B:
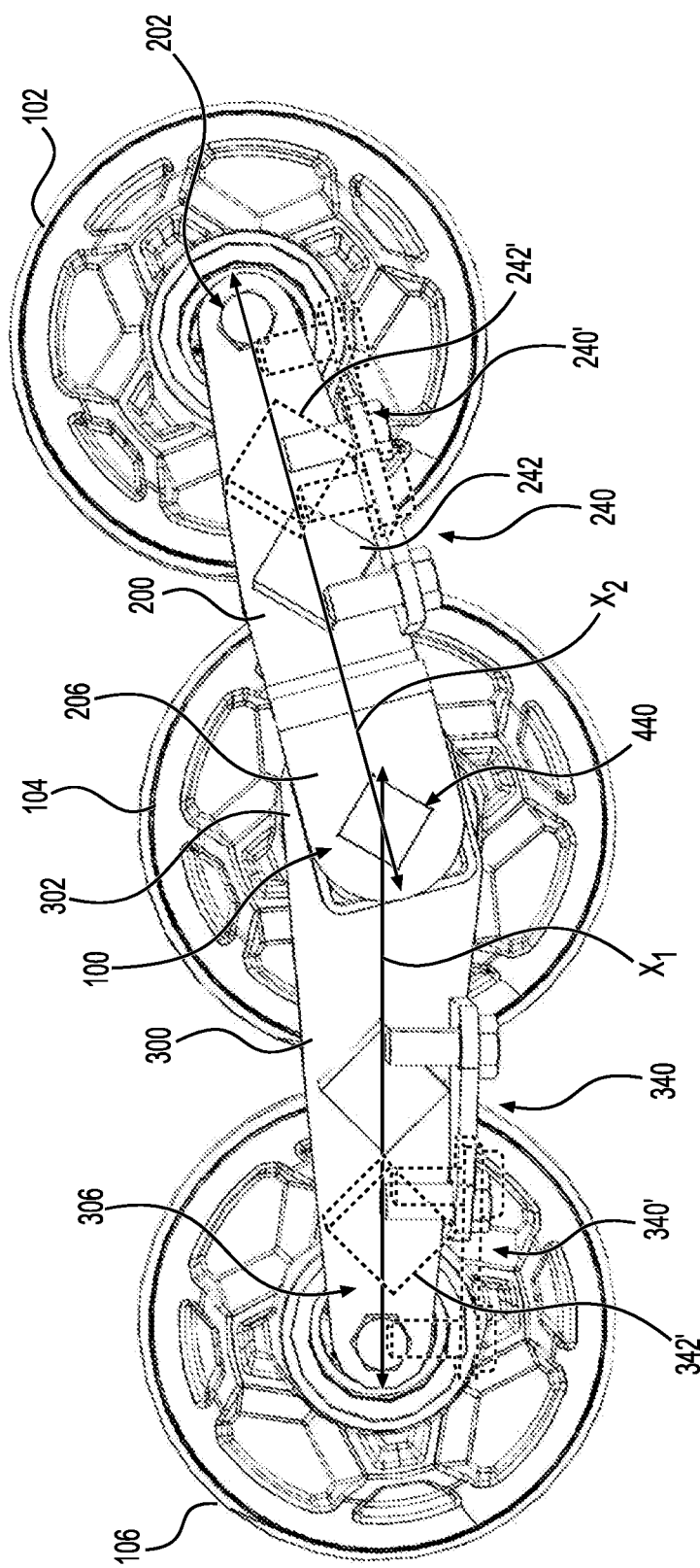
FIG. 6B is a right side elevation view of the support structure of FIG. 5, with alternate pivots shown in dotted lines.

The left and right leading linkages 200 each have a forward portion 202, an intermediate portion 204 and a rearward portion 206. The leading support wheel assembly 102 is connected to the forward portions 202 of the left and right leading linkages 200. The left and right leading linkages 200 each respectively have left and right leading pivots 242, which are respectively part of the left and right leading pivot assemblies 240, that project laterally away from the longitudinal center plane 52. In the present embodiment, the left and right leading pivots 242 are positioned at a midway point of a distance X1 extending between the forward portions 202 and the rearward portions 206 of the left and right leading linkages 200. As shown in FIG. 6B, in some embodiments, left and right leading pivot assemblies 240' (i.e., left and right leading pivots 242') could be positioned elsewhere along the left and right leading linkages 200, for instance at a quarter of the distance X1, near the forward portions 202. In the present embodiment, the left and right leading pivots 242 define a square cross-section. It is contemplated that in other embodiments, the left and right leading pivots 242 could define cross-sections with different shapes. For instance, the shapes could be polygons such as triangles, hexagons or octagons.

In the present embodiment, the intermediate portions 204 of the left and right leading linkages 200 project laterally away from the longitudinal center plane 52, resulting in the rearward portions 206 being laterally spaced from their respective forward portions 202. In other words, the rearward portions 206 extend outwardly from the forward portions 202.

Figure 8:
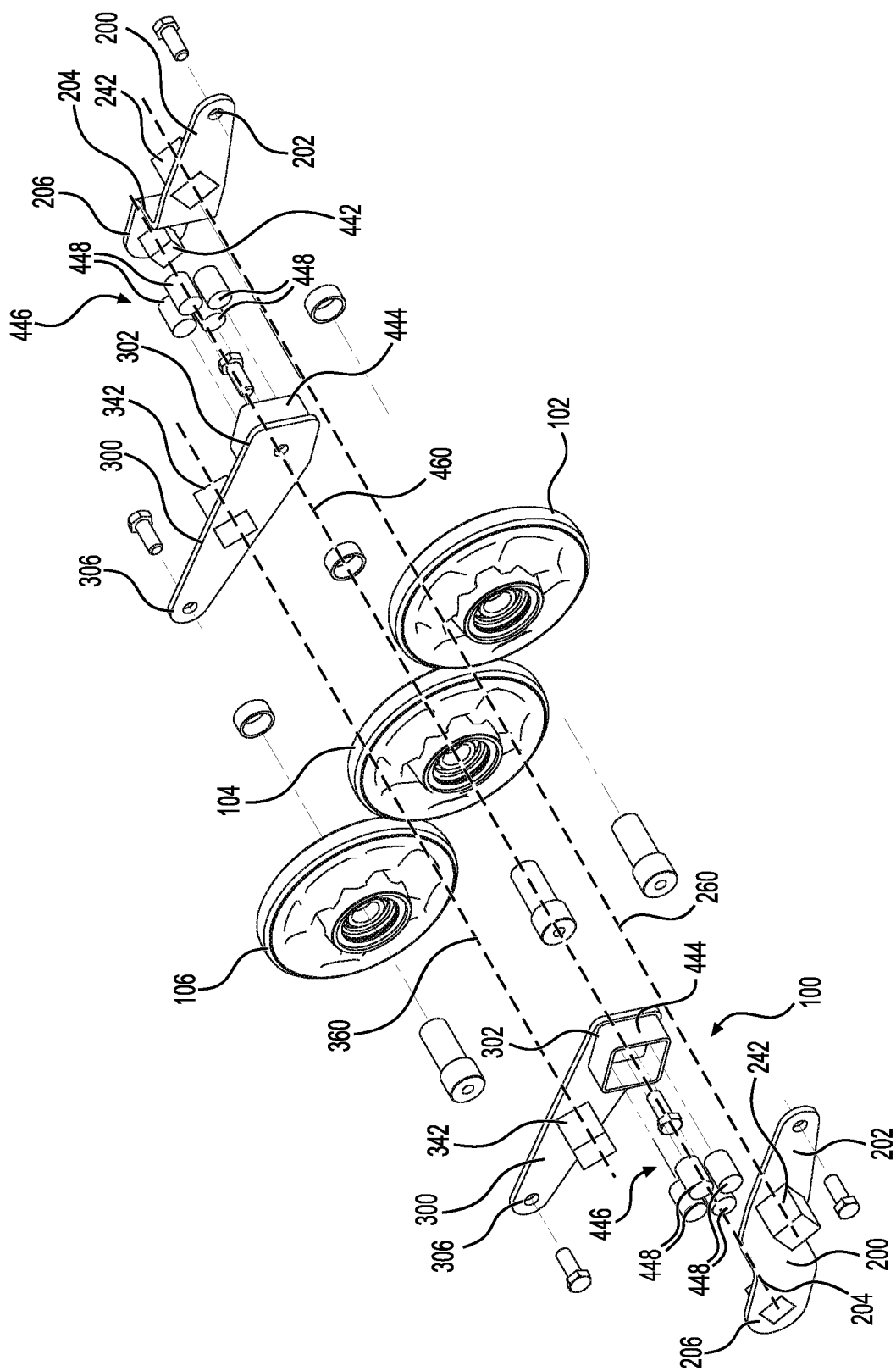
FIG. 8 is an exploded, perspective view taken from a top, front, right side of the support structure of FIG. 5.

As best seen in FIG. 8, the left and right leading linkages 200 respectively have left and right intermediate pivots 442, which are respectively part of the left and right intermediate pivot assemblies 440, that project laterally towards the longitudinal center plane 52. The left and right intermediate pivots 442 are positioned on the rearward portions 206 of the left and right leading linkages 200. In the present embodiment, the left and right intermediate pivots 442 define a square cross-section. It is contemplated that in other embodiments, the left and right intermediate pivots 442 could define cross-sections with different shapes. For instance, the shapes could be polygons such as triangles, hexagons or octagons.

Referring to FIGS. 5 and 8, the left and right trailing linkages 300 each have a forward portion 302 and a rearward portion 306, which, in the present embodiment, are longitudinally aligned. The left and right trailing linkages 300 respectively have left and right intermediate housings 444, which are part of the left and right intermediate pivot assemblies 440, that project laterally away from the longitudinal center plane 52. In the present embodiment, the left and right intermediate housings 444 are positioned on the forward portion 302 of the left and right trailing linkages 300.

The left and right trailing linkages 300 also respectively have left and right trailing pivots 342, which are respectively part of the left and right trailing pivot assemblies 340, that project laterally away from the longitudinal center plane 52. In the present embodiment, the left and right trailing pivots 342 are positioned at a midway point of a distance X2 extending between the forward portions 302 and the rearward portions 306 of the left and right trailing linkages 300. As shown in FIG. 6B, in some embodiments, left and right trailing pivot assemblies 340' (i.e., left and right trailing pivots 342') could be positioned elsewhere along the left and right trailing linkages 300, for instance at a quarter of the distance X2, near the rearward portions 306. In the present embodiment, the left and right trailing pivots 342 define a square cross-section. It is contemplated that in other embodiments, the left and right trailing pivots 342 could define cross-sections with different shapes. For instance, the shapes could be polygons such as triangles, hexagons or octagons. The trailing support wheel assembly 106 is connected to the rearward portions 306 of the left and right trailing linkages 300.

It is contemplated that in some embodiments, the left and right intermediate pivots 442 could project from the left and right trailing linkages 300, and the left and right intermediate housings 444 could project from the left and right leading linkages 200. In other embodiments, the forward portions 302 of the left and right trailing linkages could be laterally spaced from the rearward portions 306.

Still referring to FIGS. 5 to 8, the left and right leading pivot assemblies 240 will now be described in greater detail. The left and right leading pivot assemblies 240 have the left and right leading pivots 242, which were described above. The left and right leading pivot assemblies 240 define a leading pivot axis 260 (best seen in FIG. 4) that is perpendicular to the longitudinal center plane 52, and that spans through the left and right leading pivots 242. In the present embodiment, the left and right leading pivot assemblies 240 have left and right leading housings 244. In the present embodiment, the left and right leading housings 244 are rigidly connected to the frame assembly 84. It is contemplated that in other embodiments, the left and right leading housings 244 could be rigidly connected to the left and right leading linkages 200. As will be explained in greater detail below, the left and right leading housings 244 are adapted to receive the left and right leading pivots 242. In the present embodiment, the left and right leading housings 244 have left and right leading housing covers 245. It is contemplated that in some embodiments, the covers 245 could be omitted. The left and right leading pivot assemblies 240 also have left and right leading platforms 250 located, respectively, below the left and right leading pivots 242. The left and right leading pivot assemblies 240 each also have two bolts 252.

Figure 7:
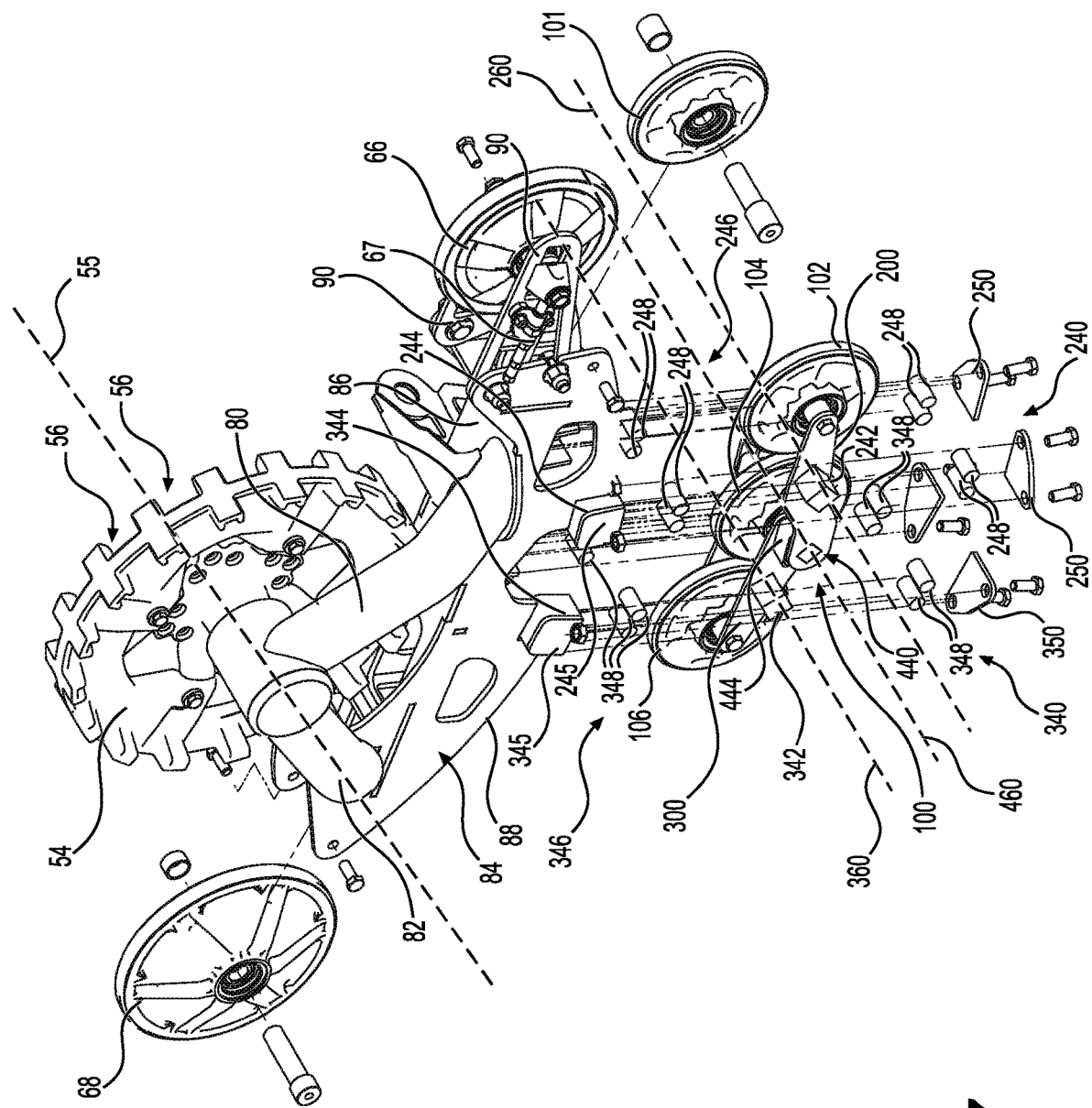
FIG. 7 is a partially exploded, perspective view taken from a top, front, right side of the track system of FIG. 1, with the endless track omitted.

In the present embodiment, the left and right leading pivot assemblies 240 further have the left and right leading biasing assemblies 246 (FIG. 7). The left and right leading biasing assemblies 246 each have four resilient elements 248 that are adapted to be received in the left and right leading housings 244 (i.e. four resilient elements 248 in each housing 244), along with the corresponding left and right leading pivots 242. It is contemplated that in other embodiments, the number of resilient elements 248 could differ. In the present embodiment, the resilient elements 248 have a cylindrical shape, but it is contemplated that in other embodiments, the resilient elements 248 could have another shape. For each of the left and right leading pivot assemblies 240, the resilient members 248 and the left and right leading pivots 242 are respectively received in the left and right leading housings 244 such that the resilient elements 248 are seated in each one of the four corners of the left and right leading housings 244. Each one of the resilient elements 248 is pressing against one of the sides of the left and right leading pivots 242. This assembly is kept in place partly thanks to the left and right leading platforms 250 and the bolts 252, as the bolts 252 respectively connect the left and right leading platforms 250 to the left and right leading housings 244. It is contemplated that in some embodiments, the resilient elements 248 could be directly molded to the left and right leading housings 244.

The left and right intermediate pivot assemblies 440 will now be described in greater detail. The left and right intermediate pivot assemblies 440 have the left and right intermediate pivots 442, and the left and right intermediate housing 444, which were described above. As will be explained in greater detail below, the left and right intermediate housings 444 are adapted to receive the left and right intermediate pivots 442. The left and right intermediate pivot assemblies 440 define an intermediate pivot axis 460 (best seen in FIG. 4) that is perpendicular to the longitudinal center plane 52, and that spans through the left and right intermediate pivots 442. In the present embodiment, the intermediate support wheel assembly 104 is rotatably connected to the leading and trailing linkages 200, 300 in part due to the left and right intermediate pivot assemblies 440.

In the present embodiment, the left and right intermediate pivot assemblies 440 have the left and right intermediate biasing assemblies 446. The left and right intermediate biasing assemblies 446 each have four resilient elements 448 that are adapted to be received in the left and right intermediate housings 444 (i.e. four resilient elements 448 in each housing 444), along with the corresponding left and right intermediate pivots 442. It is contemplated that in other embodiments, the number of resilient elements 448 could differ. In the present embodiment, the resilient elements 448 have a cylindrical shape, but it is contemplated that in other embodiments, the resilient elements 448 could have another shape. For each of the left and right intermediate pivot assemblies 440, the resilient members 448 and the pivots 442 are received in the intermediate housings 444 such that the resilient elements 448 are seated in each one of the four corners of the left and right intermediate housings 444. Each one of the resilient elements 448 is pressing against one of the sides of the left and right intermediate pivots 442. It is contemplated that in some embodiments, the resilient elements 448 could be directly molded to the left and right intermediate housings 444.

The left and right trailing pivot assemblies 340 will now be described in greater detail, although they are very similar to the left and right leading pivot assemblies 240. The left and right trailing pivot assemblies 340 have the left and right trailing pivots 342, which were described above. The left and right trailing pivot assemblies 340 define a trailing pivot axis 360 (best seen in FIG. 4) that is perpendicular to the longitudinal center plane 52, and that spans through the left and right trailing pivots 342. In the present embodiment, the left and right trailing pivot assemblies 340 have left and right trailing housings 344. In the present embodiment, the left and right trailing housings 344 are rigidly connected to the frame assembly 84. It is contemplated that in other embodiments, the left and right trailing housings 344 could be rigidly connected to the left and right trailing linkages 300. As will be explained in greater detail below, the left and right trailing housings 344 are adapted to receive the left and right trailing pivots 342. In the present embodiment, the left and right trailing housings 344 have left and right trailing housing covers 345. It is contemplated that in some embodiments, this covers 345 could be omitted. The left and right trailing pivot assemblies 340 also have left and right trailing platforms 350 located, respectively, below the left and right trailing pivots 342. The left and right trailing pivot assemblies 340 each also have two bolts 352.

In the present embodiment, the left and right trailing pivot assemblies 340 further have the left and right trailing biasing assemblies 346. The left and right trailing biasing assemblies 346 each have four resilient elements 348 that are adapted to be received in the left and right trailing housings 344 (i.e. four resilient elements 348 in each housing 344), along with the corresponding left and right trailing pivots 342. It is contemplated that in other embodiments, the number of resilient elements 348 could differ. In the present embodiment, the resilient elements 348 have a cylindrical shape, but it is contemplated that in other embodiments, the resilient elements 348 could have another shape. For each of the left and right trailing pivot assemblies 340, the resilient members 348 and the left and right trailing pivots 342 are respectively received in the left and right trailing housings 344 such that the resilient elements 348 are seated in each one of the four corners of the left and right trailing housings 344. Each one of the resilient elements 348 is pressing against one of the sides of the left and right trailing pivots 342. This assembly is kept in place partly thanks to the left and right trailing platforms 350 and the bolts 352, as the bolts 352 respectively connect the left and right trailing platforms 350 to the left and right trailing housings 344. It is contemplated that in some embodiments, the resilient elements 348 could be directly molded to the left and right trailing housings 344.

Endless Track

Figure 9:
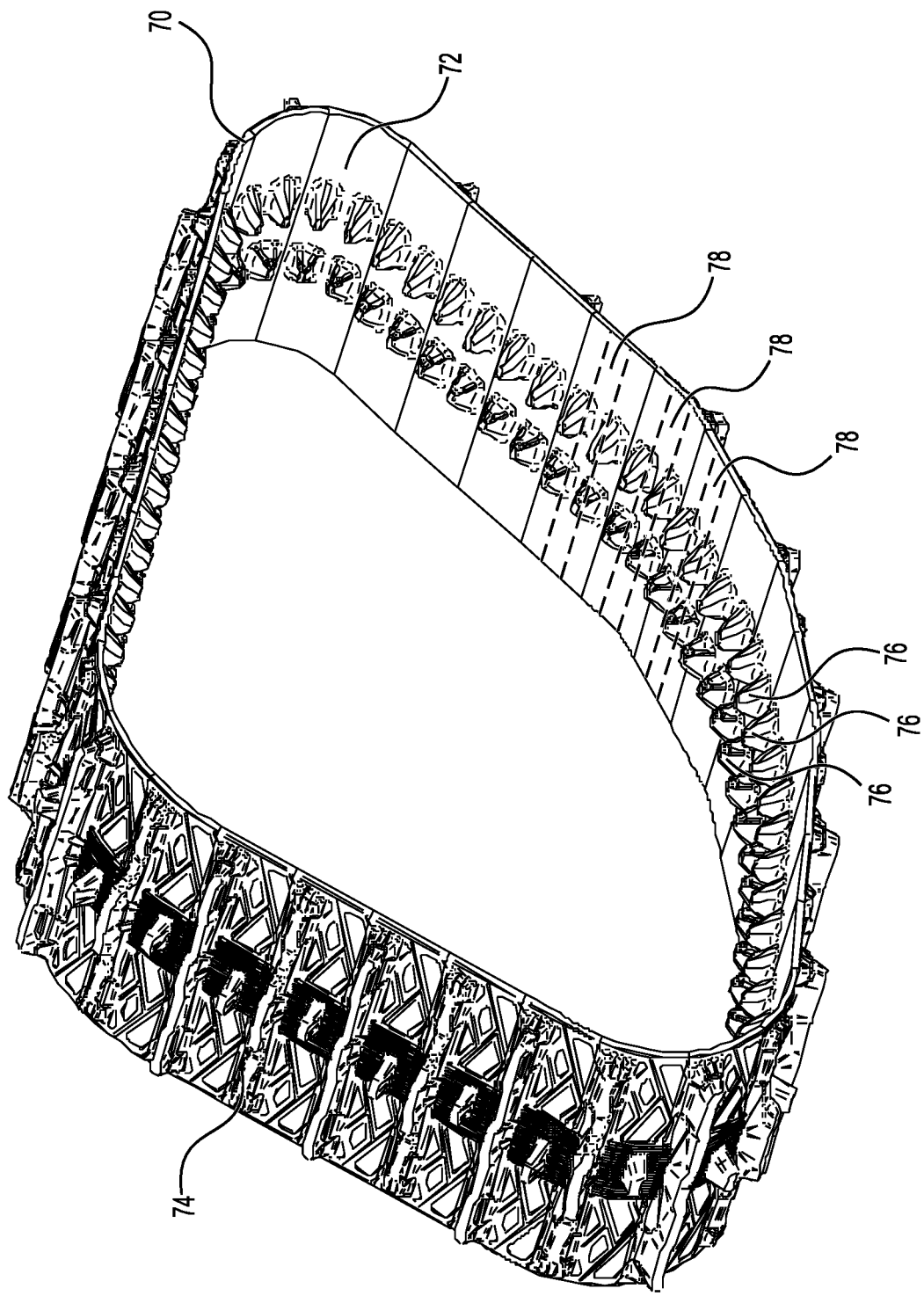
FIG. 9 is a perspective view taken from a top, rear, right side of the endless track of FIG. 1.

Referring to FIG. 9, the endless track 70 will now be described. As will be explained in greater detail below, the endless track 70 is drivable by the sprocket wheel assembly 54. In the present embodiment, the endless track 70 is an endless polymeric track. It is contemplated that in some embodiments, the endless track 70 could be constructed of a wide variety of materials and structures including metallic components known in track systems 50. The endless track 70 has an inner surface 72 and an outer surface 74.

The inner surface 72 of endless track 70 has the left and right sets of lugs 76, which are positioned in a central portion of the inner surface 72. A central portion of the inner surface 72, between the left and right set of lugs 76, is engaged by the wheel assemblies 66, 68, 101, 102, 104, 106. The left and right sets of lugs 76 are laterally spaced from one another so as to provide clearance for the wheel assemblies 66, 68 101, 102, 104, 106 to engage the inner surface 72 without interference. As will be explained in greater detail below, the left and right set of lugs 76 are adapted to be received within the recesses 56 of the sprocket wheel assembly 54.

The outer surface 74 of the endless track 70 has a tread defined thereon. It is contemplated that the tread could vary from one embodiment to another. In some embodiments, the tread could depend on the type of vehicle 20 on which the track system 50 is to be used and/or the type of ground surface on which the vehicle 20 is destined to travel.

The endless track 70 has laterally extending reinforcing members 78 (only three of them are schematically shown in FIG. 9). In the present embodiment, the reinforcing members 78 span the width of the endless track 70. It is contemplated that in some embodiments, the reinforcing members 78 could span only a portion of the width of the endless track 70. In the present embodiment, the reinforcing members 78 are plank-shaped. It is contemplated that in some embodiments, the reinforcing members 78 could have another shape such as a rod-like shape. The reinforcing members 78 extend perpendicularly to the longitudinal center plane 52. The reinforcing members 78 are longitudinally distributed along the endless track 70, and are longitudinally spaced from one another. In the present embodiment, the reinforcing members 78 are inside the endless track 70. It is contemplated, however, that in other embodiments, the reinforcing members 78 could be on the inner surface 72. In yet other embodiments, the reinforcing members 78 could be on the outer surface 74. It is also contemplated that in some embodiments, the reinforcing members 78 could be omitted. As will be explained in greater detail below, the reinforcing members 78 help to distribute the load applied by the track system 50 to the ground across the width of the endless track 70.

Materials and Manufacturing

The various components of the support structure 100 and the track system 50 are made of conventional materials (e.g. metals and metal alloys in most cases, such as steel) via conventional manufacturing processes (e.g. casting, molding, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Track System in Operation

Referring to FIGS. 2 and 10 to 13, the track system 50 and the support structure 100, while in use, will now be described in greater detail as seen from a right side elevation view and travelling in the forward direction, as indicated by the arrow 21. In the present embodiment, the track system 50 and the support structure 100 have an initial position which is best seen in FIG. 10. It is contemplated that in some embodiments, the initial position of the track system 50 and/or the support structure 100 could be different.

In the present embodiment, the sprocket wheel assembly 54 receives the left and right sets of lugs 76 in the left and right sets of recesses 56. The wheel assemblies 66, 68, 101, 102, 104, 106 are longitudinally aligned and engage a central portion of the inner surface 72 of the endless track 70, between the left and right set of lugs 76. The left and right set of lugs 76 help to prevent the track system 50 from detracking, when the track system 50 is steered, for example.

The wheel assemblies 66, 68, 101, 102, 104, 106 apply pressure points where they engage the endless track 70, and form a ground pressure profile. In the present embodiment, the wheel assemblies 66, 68, 101, 102, 104, 106 are travelling on relatively flat and hard ground surface, and as such, form a thin and linear ground pressure profile.

More precisely, in the present embodiment, the load sustained by the wheel assemblies 66, 68, 101, 102, 104, 106 is distributed to the endless track 70, which is therefore distributed to the laterally extending reinforcing members 78. Thus, the pressure applied by the track system 50 to the ground is reduced, and the ground pressure profile becomes wider. In embodiments where the laterally extending reinforcing members 78 are omitted, the pressure profile remains thin. Having a thin pressure profile can help improve steering, as reduced friction reduces steering effort.

In the present embodiment, as best seen in FIG. 4, the support structure 100 is configured such that the leading, intermediate and trailing pivot axes 260, 460, 360 are longitudinally offset from the sprocket axis 55, thus the leading, intermediate and trailing pivot axes 260, 460, 360 are longitudinally offset from the driving axle 22. This permits the support structure 100 to reduce vibrations and shocks transferred from the wheel assemblies 66, 68, 101, 102, 104, 106 to the frame assembly 84. In addition, the resilient members 248, 348, 448 act as dampeners, and therefore further reduce the vibrations and shocks transmitted from the leading, intermediate and trailing support wheel assemblies 102, 104, 106 to the frame assembly 84.

In the present embodiment, the resilient members 248, 348 are easily accessible thanks to the leading and trailing housing covers 245, 345. This is useful for various reasons, including facilitating the replacement of the resilient members 248, 348, if needed.

Referring to FIG. 10, the track system 50 is configured such that in the initial position, the leading idler wheel assembly 66 is elevated with respect to the ground, the frame support wheel assembly 101, the leading, intermediate and trailing support wheel assemblies 102, 104, 106 and the trailing idler wheel assembly 68. The frame support wheel assembly 101 is elevated with respect to the ground, to the leading, intermediate and trailing support wheel assemblies 102, 104, 106 and the trailing idler wheel assembly 68. The trailing idler wheel 68 is elevated with respect to the ground and to the leading, intermediate and trailing support wheel assemblies 102, 104, 106.

In the present embodiment, the support structure 100 is configured such that in the initial position, the leading support wheel assembly 102 is elevated with respect to the ground and to the intermediate and trailing support wheel assemblies 104, 106 while the intermediate and trailing support wheel assemblies 104, 106 are on ground level. Thus, the leading linkage 200 is elevated with respect to the ground, by an angle of approximately 20 degrees. It is contemplated that in some embodiments, the angle could be less than or more than 20 degrees. For instance, in some embodiments, the angle could be 10 degrees or 30 degrees.

As will be explained in greater detail below, as soon as the support structure 100 is offset from its initial position, so upon movement of any one of the leading and trailing linkages 200, 300 and/or the leading, intermediate or trailing support wheel assemblies 102, 104, 106, the leading, intermediate and trailing biasing assemblies 246, 446, 346 apply biasing forces to the leading and trailing linkages 200, 300 so that they return toward their initial position. In the present embodiment, the leading, intermediate and trailing biasing assemblies 246, 446, 346 have the same biasing forces. It is contemplated that in other embodiments, the leading, intermediate and trailing biasing assemblies 246, 446, 346 could have different biasing forces. In alternate embodiments, the leading and trailing biasing assemblies 246, 346 could have different biasing forces than the intermediate biasing assemblies 446. Any such combination is contemplated. The leading, intermediate and trailing biasing assemblies 246, 446, 346 also dampen the pivotal movement of the leading and trailing linkages 200, 300 about the pivot axes 260, 360. Furthermore, the positioning of the left and right leading and trailing pivots 242, 342 can impact how the biasing forces of the leading, intermediate and trailing biasing assemblies 246, 445, 346 are applied to the leading, intermediate or trailing support wheel assemblies 102, 104, 106. For example, as shown in FIG. 6B, in embodiments where the left and right leading pivots 242' are closer to the forward portions 202, torque resulting from the leading biasing assemblies 236 will be greater at the intermediate wheel assembly 104 than at the leading wheel assembly 102.

Referring to FIG. 10, the track system 50 is moving in the forward direction. The track system 50 is driven by the sprocket wheel assembly 54. More precisely, the driving axle 22 drives the sprocket wheel assembly 54, which in turns drives the endless track 70. The track system 50 has an obstacle 95 in its way. For the purpose of the illustrative example provided below, the obstacle 95 is a rock 95. It is contemplated that track system 50 could encounter another obstacle such as a hill, a ditch or a log. It is also contemplated that the size of the obstacle could be different.

As the track system 50 is moving in the forward direction without any interference, the track system 50 and the support structure 100 are in their initial positions.

Figure 11:
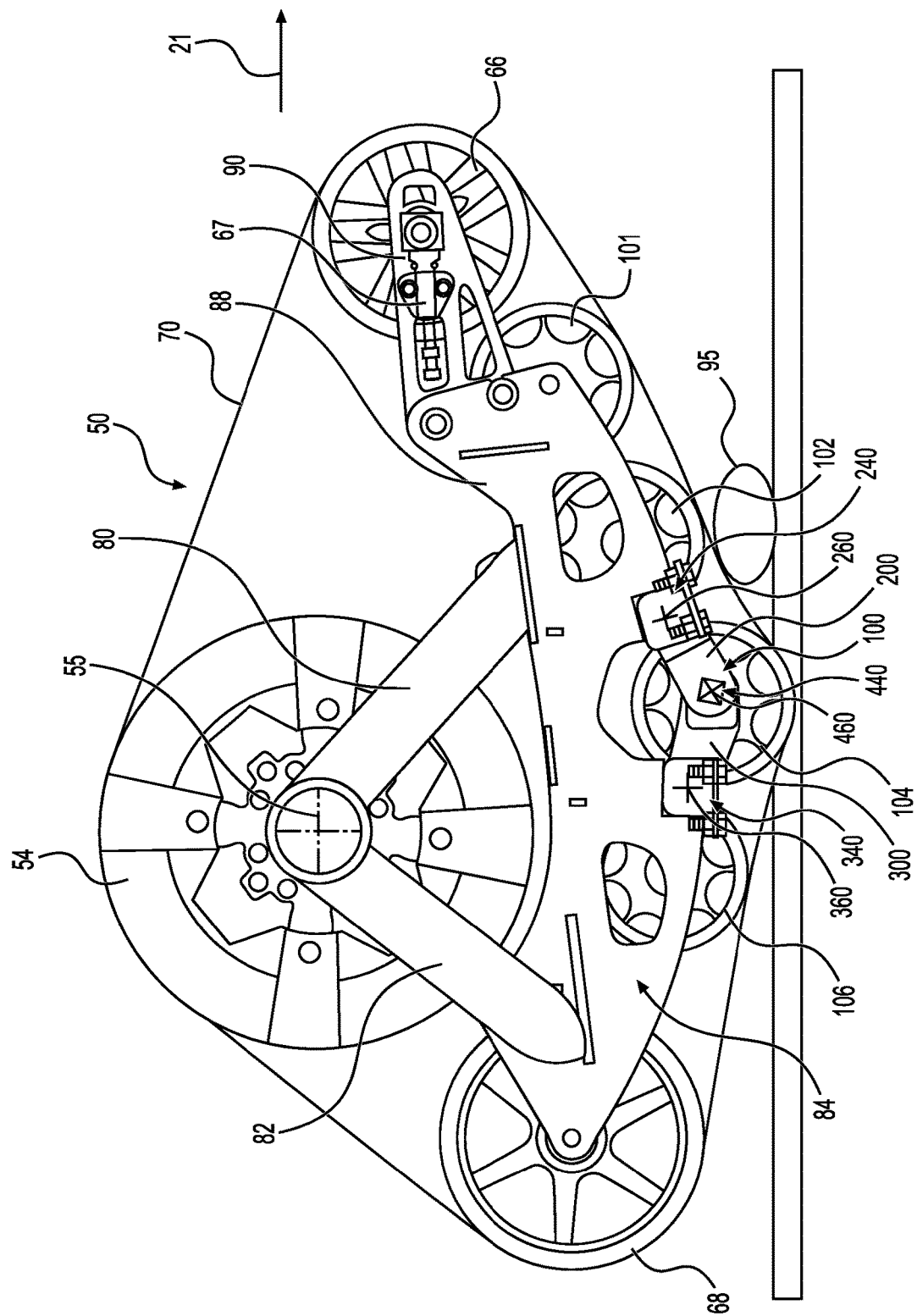
FIG. 11 is a right side elevation view of the track system of FIG. 10 engaging an obstacle and with the support structure of the track system of FIG. 10 in a first position.

Referring now to FIG. 11, the track system 50 has encountered the rock 95. The rock 95 comes into contact with the outer surface 74 of the endless track 70, below the leading support wheel assembly 102. The rock 95 causes the leading support wheel assembly 102 to move in the upwards direction.

The leading support wheel assembly 102 moving in the upwards direction causes the left and right leading linkages 200 to pivot about the leading pivot axis 260 in a counter-clockwise direction. Therefore, the forward portions 202 of the left and right leading linkages 200 move in the upwards direction, and the rearward portions 206 of the left and right leading linkages 200 move in the downwards direction.

The pivotal movement of the left and right leading linkages 200 in the counter-clockwise direction causes the intermediate support wheel assembly 104, and thus the left and right intermediate pivot assembly 440, to move in the downwards direction. Therefore, the intermediate pivot axis 460 also moves in the downwards direction.

The pivotal movement of the left and right leading linkages 200 also causes the left and right trailing linkages 300 to pivot about the trailing pivot axis 360 in the clockwise direction. Therefore, the forward portions 302 of the left and right trailing linkages 300 move in the downwards direction, and the rearward portions 306 of the left and right trailing linkages 300 move in the upwards direction. Therefore, the trailing support wheel assembly 106 moves in the upwards direction.

To summarize, when the leading support wheel assembly 102 moves in the upwards direction, the intermediate support wheel assembly 104 moves in the downwards direction, and the trailing support wheel assembly 106 moves in the upwards direction. As such, when the left and right leading linkages 200 move in the counter-clockwise direction, and the left and right trailing linkages 300 move in the clockwise direction. The movement of the support structure 100 resembles the movement of scissors being closed in the upwards direction about the intermediate pivot axis 460.

As soon as the support structure 100 is offset from its initial position, in this case, as soon as the leading support wheel assembly 102 moves upwards because of the rock 95, the leading, intermediate and trailing biasing assemblies 246, 446, 346 apply biasing forces to the support structure 100 to make it return toward its initial position. Therefore, referring to FIG. 11, when the left and right leading linkages 200 pivot counter-clockwise, the left and right leading biasing assemblies 246 apply biasing forces in the clockwise direction to the left and right leading linkages 200 so that they return toward their initial position. When the left and right trailing linkages 300 pivot clockwise, the left and right trailing biasing assemblies 346 apply biasing forces in the counter-clockwise direction to the left and right trailing linkages 300 so that they return toward their initial position. The left and right intermediate biasing assemblies 446 also apply biasing forces to the leading and trailing linkages 200, 300 to make the support structure 100 return toward its initial position. Thus, the leading, intermediate and trailing biasing assemblies 246, 446, 346 work together to make the support structure 100 return toward its initial position.

The configuration of the support structure 100, the way it moves, along with the biasing forces, help the track system 50 overcome the rock 95. Since the intermediate support wheel assembly 104 is in the downwards position and the leading support wheel assembly 102 is in the upwards position, the endless track 70 is generally tangent to the rock 95, which increases contact area, and therefore enhances traction.

Figure 12:
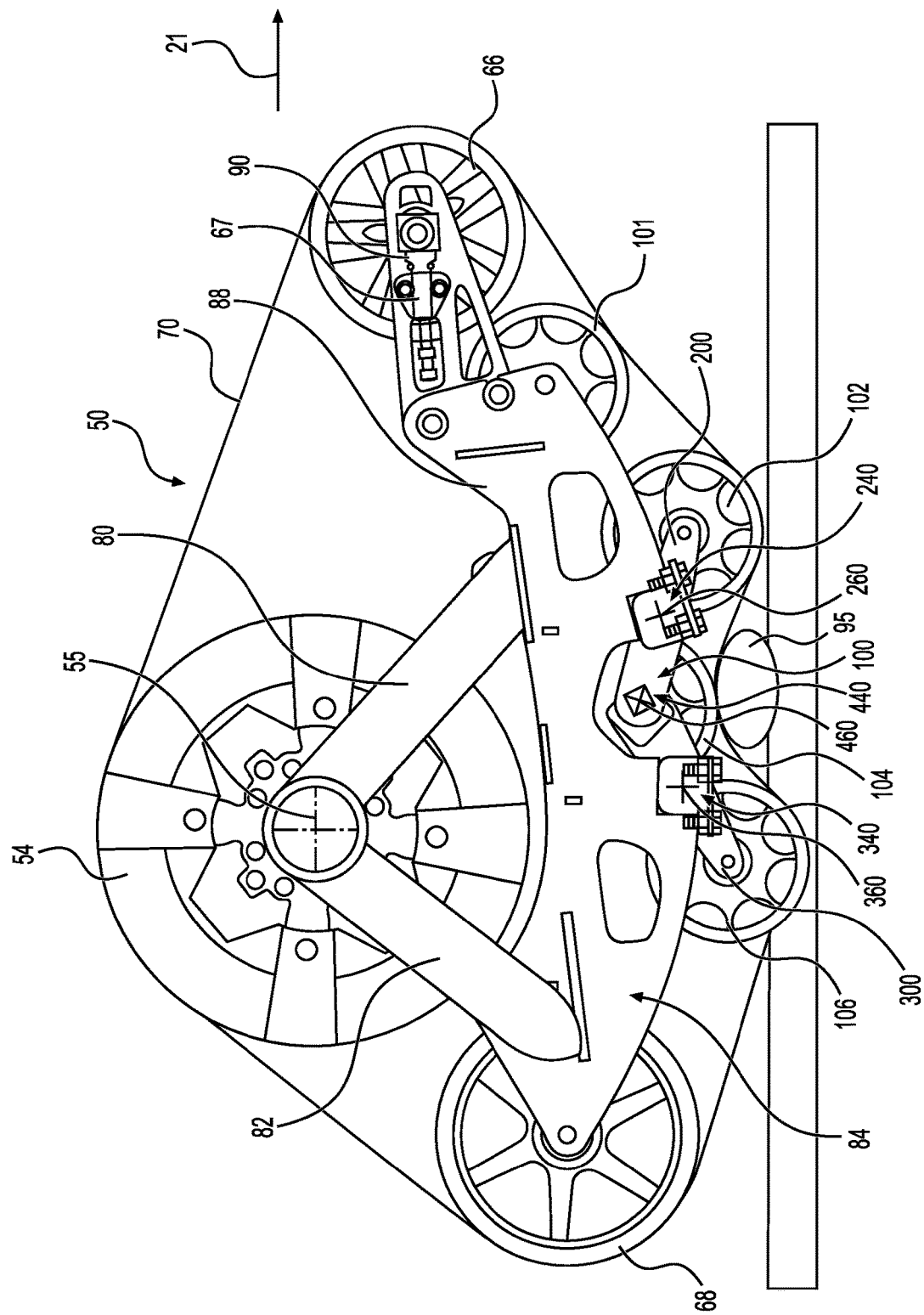
FIG. 12 is a right side elevation view of the track system of FIG. 10 engaging the obstacle and with the support structure of the track system of FIG. 10 in a second position.

Referring now to FIG. 12, describing the operation of the support structure 100 from FIG. 11 to FIG. 12, the biasing forces and the forward motion of track system 50 result in the support structure 100 briefly reaching its initial position. However, as shown in FIG. 12, the track system 50 has moved in the forward direction such that the rock 95 is now in contact with the outer surface 74 of the endless track 70, below the intermediate support wheel assembly 104. The rock 95 causes the intermediate wheel assembly 104 to move in the upwards direction.

The intermediate wheel assembly 104, and thus the left and right intermediate pivot assemblies 440 and the intermediate pivot axis 460, moving in the upwards direction cause the left and right leading linkages 200 to pivot about the leading pivot axis 260 in the clockwise direction. Therefore, the forward portions 202 of the left and right leading linkages 200 move in the downwards direction, and the rearward portions 206 of the left and right leading linkages 200 move in the upwards direction. As such, the leading support wheel assembly 102 moves in the downwards direction.

The intermediate wheel assembly 104 moving in the upwards direction also causes the left and right trailing linkages 300 to pivot about the trailing pivot axis 360 in the counter-clockwise direction. Therefore, the forward portions 302 of the left and right trailing linkages 300 move in the upwards direction, and the rearward portions 306 of the left and right trailing linkages 300 move in the downwards direction. As such, the trailing support wheel assembly 106 moves in the downwards direction.

To summarize, as the intermediate support wheel assembly 104 moves in the upwards direction, the leading and trailing support wheel assemblies 102, 106 move in the downwards direction. As such, the left and right leading linkages 200 move in the clockwise direction, and the left and right trailing linkages 300 move in the counter-clockwise direction. The movement of the support structure 100 resembles the movement of scissors being closed in the downward direction about the intermediate pivot axis 460.

As soon as the support structure 100 is offset from its initial position, in this case, as soon as the intermediate support wheel assembly 104 begins moving upwards because of the rock, the leading, intermediate and trailing biasing assemblies 246, 446, 346 applying biasing forces to the support structure 100 so that it returns to its initial position. Therefore, referring to FIG. 12, when the left and right leading linkages 200 pivot clockwise, the left and right leading biasing assemblies 246 apply biasing forces in the counter-clockwise direction to the left and right leading linkages 200, so that they return toward their initial position. When the left and right trailing linkages 300 pivot counter-clockwise, the left and right trailing biasing assemblies 346 apply biasing forces to the left and right trailing linkages 300 so that they return toward their initial position. The left and right intermediate biasing assemblies 446 also apply biasing forces to the leading and trailing linkages 200, 300 to make the support structure 100 return toward its initial position. Thus, once again, the leading, intermediate and trailing biasing assemblies 246, 446, 346 work together to make the support structure 100 return toward its initial position.

In the present embodiment, when the intermediate support wheel assembly 104 reaches a peak position in the upwards direction (such as in FIG. 12), the biasing forces are at a first maximum. The biasing forces also reach a second maximum when the intermediate wheel assembly 104 is at a peak position in the downwards direction. In the present embodiment, the first maximum and the second maximum are the same, but it is contemplated that in other embodiments, the first maximum could be greater than the second maximum or vice-versa. The biasing forces help the track system 50 overcome the rock 95.

Figure 13:
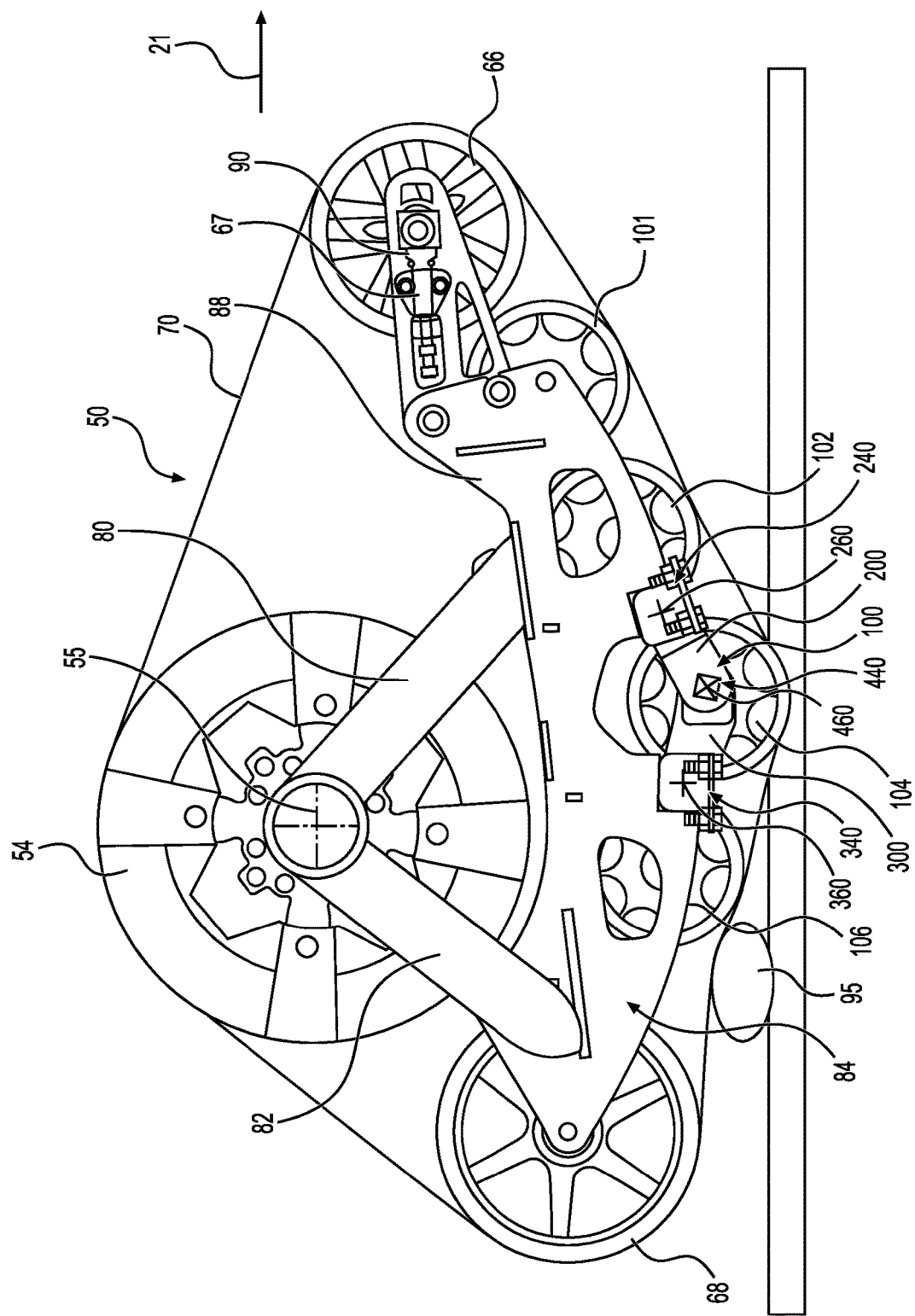
FIG. 13 is a right side elevation view of the track system of FIG. 10 having overcome the obstacle and with the support structure of the track system of FIG. 10 reverted in the first position.

Referring now to FIG. 13, describing the operation of the support structure 100 from FIG. 12 to FIG. 13, the biasing forces and the forward motion of the track system 50 result in the support structure 100 briefly reaching its initial position. However, as shown in FIG. 13, the track system 50 has moved forward such that the rock 95 is just ending contact with the outer surface 74 of the endless track 70, below the trailing support wheel assembly 106. The rock 95, as it is ending its contact with the endless track 70, is preventing, to some degree, the trailing support wheel assembly 106 to return toward its initial position.

The biasing forces are biasing the support structure 100 to return toward its initial position. Thus, the biasing forces make the trailing support wheel assembly 106 moving in the downwards direction towards its initial position, which causes the left and right trailing linkages 300 to pivot about the trailing axis 360 in the counter-clockwise direction. Therefore, the forward portions 302 of the left and right trailing linkages 300 move in the upwards direction, and the left and right rearward portions 306 of the trailing linkages 300 move in the downwards direction.

The pivotal movement of the left and right trailing linkages 300, along with the biasing forces, cause the intermediate support wheel assembly 104 to move in the upwards direction, towards its initial position, and cause the left and right leading linkages 200 to pivot about the leading pivot axis 260 in the clockwise direction. Therefore, the forward portions 202 of the left and right leading linkages 200 move in the downwards direction, and the rearward portions 206 of the left and right leading linkages 200 move in the upwards direction. Thus, the leading support wheel assembly 106 moves in the downwards direction, towards its initial position.

To summarize, as the track system 50 is almost past the rock 95, when the trailing support wheel assembly 106 is moving in the downwards direction, the intermediate support wheel assembly 104 is moving in the upwards direction, and the leading support wheel assembly 102 is moving in the downwards direction. The movement of the support structure 100 resembles the movement of scissors being opened in the upwards direction with respect to the intermediate pivot axis 460.

Eventually, the rock 95 is no longer in contact with the track system 50, and the track system 50 and the support structure 100 have reached their initial positions. It is contemplated that in some embodiments, the speed at which the track system 50 and the support structure 100 reach their initial position after the rock 95 is no longer contacting the endless track 70 could be different.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A support structure for connecting a plurality of support wheel assemblies to a frame member of a track system, the track system defining a longitudinal direction, the support structure comprising:
    a leading linkage pivotally connectable to the frame member by a leading pivot, the leading pivot defining a leading pivot axis transverse to the longitudinal direction;
    a trailing linkage pivotally connectable to the frame member by a trailing pivot, the trailing pivot defining a trailing pivot axis transverse to the longitudinal direction, and pivotally connected to the leading linkage by an intermediate pivot, the intermediate pivot defining an intermediate pivot axis transverse to the longitudinal direction; and
    at least one biasing assembly connected to at least one of the leading linkage and the trailing linkage;
    the plurality of support wheel assemblies including:
        a leading support wheel assembly connected to the leading linkage;
        a trailing support wheel assembly connected to the trailing linkage; and
        an intermediate support wheel assembly connected to at least one of the leading and trailing linkages;
    the support structure being adapted to move such that when the leading support wheel assembly moves in a first direction, the intermediate support wheel assembly moves in a second direction, and the trailing support wheel assembly moves in the first direction; and
    the support structure, the leading, intermediate and trailing support wheel assemblies having an initial position, and the at least one biasing assembly biasing the support structure to return toward the initial position upon movement of any one of the leading, intermediate and trailing support wheel assemblies.

2. The support structure of claim 1, wherein upon movement of any one of the leading, intermediate and trailing support wheel assemblies, the leading linkage pivots about the leading pivot, and the trailing linkage pivots about the trailing pivot.

3. The support structure of claim 1, wherein the leading linkage and the trailing linkage pivot about the intermediate pivot in a scissor-like fashion.

4. The support structure of claim 1, wherein the at least one biasing assembly includes a leading biasing assembly, an intermediate biasing assembly and a trailing biasing assembly.

5. The support structure of claim 4, wherein:
    the leading biasing assembly is connected to the leading pivot;
    the intermediate biasing assembly is connected the intermediate pivot; and
    the trailing biasing assembly is connected to the trailing pivot.

6. The support structure of claim 4, wherein the leading, intermediate and trailing biasing assemblies have different biasing forces.

7. The support structure of claim 4, wherein at least two of the leading, intermediate and the trailing biasing assemblies have equal biasing forces.

8. The support structure of claim 5, wherein at least one of:
    the leading pivot has a square cross-section, the leading biasing assembly includes a leading housing connected to the leading linkage, and four resilient elements seated in the corners of the leading housing and being pressed against the leading housing by the leading pivot;

the trailing pivot has a square cross-section, the trailing biasing assembly includes a trailing housing connected to the trailing linkage, and four resilient elements seated in the corners of the trailing housing and being pressed against the trailing housing by the trailing pivot; and the intermediate pivot has a square cross-section, the intermediate biasing assembly includes a intermediate housing connected to one of the leading and trailing linkages, and four resilient elements seated in the corners of the intermediate housing and being pressed against the intermediate housing by the intermediate pivot.

9. The support structure of claim 1, wherein the leading, intermediate and trailing support wheel assemblies are longitudinally in-line.

10. The support structure of claim 9, wherein the leading, intermediate and trailing support wheel assemblies are laterally centered relative to an endless track of the track system.

11. The support structure of claim 1, wherein the intermediate support wheel assembly is connected to the leading linkage and to the trailing linkage by the intermediate pivot.

12. The support structure of claim 1, wherein at least one of:
the leading pivot is positioned at a midway point of the leading linkage; and
the trailing pivot is positioned at a midway point of the trailing linkage.

13. The support structure of claim 1, wherein at least one of:
the leading pivot is offset from the midway point of the leading linkage; and
the trailing pivot is offset from the midway point of the trailing linkage.

14. A track system comprising:
a frame having a frame member;
idler wheel assemblies connected to the frame;
the support structure of claim 1 connecting the leading, intermediate and trailing support wheel assemblies to the frame member; and
an endless track wrapped around the idler wheel assemblies, and the leading, intermediate and trailing support wheel assemblies.

15. A track system for a vehicle, the track system defining a longitudinal direction, and comprising:
a frame having a frame member;
idler wheel assemblies connected to the frame;
a support structure comprising:
  a leading linkage pivotally connected to the frame member by a leading pivot, the leading pivot defining a leading pivot axis transverse to the longitudinal direction;
  a trailing linkage pivotally connected to the frame member by a trailing pivot, the trailing pivot defining a trailing pivot axis transverse to the longitudinal direction, and pivotally connected to the leading linkage by an intermediate pivot, the intermediate pivot defining an intermediate pivot axis transverse to the longitudinal direction; and
  at least one biasing assembly connected to at least one of the leading linkage and the trailing linkage;
a plurality of support wheel assemblies including a leading support wheel assembly connected to the leading linkage, a trailing support wheel assembly connected to the trailing linkage, and an intermediate support wheel assembly connected to at least one of the leading and trailing linkages;
an endless track wrapped around the idler wheel assemblies, and the leading, intermediate and trailing support wheel assemblies;
the support structure being adapted to move such that when the leading support wheel assembly moves in a first direction, the intermediate support wheel assembly moves in a second direction, and the trailing support wheel assembly moves in the first direction; and
the support structure, the leading, intermediate and trailing support wheel assemblies having an initial position, and the at least one biasing assembly biasing the support structure to return toward the initial position upon movement of any one of the leading, intermediate and trailing support wheel assemblies.

16. The track system of claim 15, wherein the endless track includes a plurality of reinforcing members, the plurality of reinforcing members extending laterally across the endless track, and being distributed longitudinally along the endless track.

17. The track system of claim 15, wherein the track system is steerable.

18. The track system of claim 15, wherein the track system is connected to a driving axle of a vehicle, the driving axle defining a driving axle axis, and the leading, intermediate and trailing pivot axes are longitudinally offset from the driving axle axis.

19. A vehicle having:
a chassis;
an engine supported by the chassis; and
at least two track systems of claim 15 operatively connected to the chassis.

20. The vehicle of claim 19, wherein the vehicle is an all-terrain vehicle.

* * * * *